US006792608B1

United States Patent
Theeten

(10) Patent No.: US 6,792,608 B1
(45) Date of Patent: Sep. 14, 2004

(54) NETWORK NAVIGATOR INTERFACE SYSTEM AND METHOD

(75) Inventor: Bart A. Theeten, Raleigh, NC (US)

(73) Assignee: Alcatel, Paris (FR)

( * ) Notice: Subject to any disclaimer, the term of this patent is extended or adjusted under 35 U.S.C. 154(b) by 437 days.

(21) Appl. No.: 09/797,118

(22) Filed: Mar. 1, 2001

(51) Int. Cl.[7] .............................................. G06F 9/00

(52) U.S. Cl. ...................................... 719/316; 345/700

(58) Field of Search ........................ 709/316; 707/102, 707/103 R; 715/511; 719/316, 328; 717/108; 345/594, 762, 700

(56) References Cited

U.S. PATENT DOCUMENTS

| | | | | | |
|---|---|---|---|---|---|
| 5,920,868 | A | * | 7/1999 | Fowlow et al. | 707/103 R |
| 6,012,067 | A | * | 1/2000 | Sarkar | 707/103 R |
| 6,023,579 | A | * | 2/2000 | Hellgren et al. | 717/108 |
| 6,298,352 | B1 | * | 10/2001 | Kannan et al. | 707/102 |
| 6,424,979 | B1 | * | 7/2002 | Livingston et al. | 715/511 |
| 6,532,471 | B1 | * | 3/2003 | Ku et al. | 707/102 |

OTHER PUBLICATIONS

1998 Object Management Group (OMG) PDF document "The Common Object Request Broker: Architecture and Specification" at ftp://ftp.omg.org/pub/docs/formal/98-12-01.pdf.

* cited by examiner

Primary Examiner—Meng-Al T. An
Assistant Examiner—Van Nguyen
(74) Attorney, Agent, or Firm—Kevin Klughart; Craig A. Hoersten; V. Lawrence Sewell

(57) ABSTRACT

A network navigator interface system and method incorporating a client/server architecture in which a network coarse-grained model (or single object) (NameSpaceObject) is used to create a fine-grained object model is disclosed. The disclosed invention permits a client application to discover the detailed interface provided by each object instance in the fine-grained model. A client application wishing to invoke an operation on a server-side object first obtains an object reference (IOR) to a NameSpaceObject instance. Each NameSpaceObject instance stores a pointer to an object in the fine-grained model. The NameSpaceObject interface provides operations to move this pointer around in a hierarchical model. Once the pointer is set to reference a certain object in the fine-grained model, this object becomes the target for all further operations. The available operations include object contents discovery/manipulation, object interface discovery and operation invocation.

8 Claims, 50 Drawing Sheets

```
interface ObjectManager
{
    NameSpaceObject getHandle(in String viewId)
        raises (NoSuchViewException);
};
```

```
// Navigator Interface ifndef NAVIGATOR_IDL
define NAVIGATOR_IDL include <Types.idl>
include <Exceptions.idl> pragma prefix "corba.gem.alcatel.com"

module navigator
{
/**
 * This interface allows a client to browse the server's name space without
 * the need for any knowledge about the containment relationship between the
 * objects in the name space.  Cfr. browsing a directory structure.<p>
 * A NameSpaceObject instance points to one particular object in the server's
 * name space.  The provided actions move this pointer around, reusing the
 * current NameSpaceObject's handle (IOR).<p>
 * The initial NameSpaceObject handle (IOR) is obtained from the specific
 * domain server.
 **/
interface NameSpaceObject
{
```

```
/**
 * Sets the object pointer to the object given by <code>fdn</code>.
 *
 * @exception NoSuchObjectInstance  when the current object is invalid or
 *                                  when the object with given FDN could
 *                                  not be found in the model.
 **/
void moveTo(in Types::EntityId fdn)
    raises (Exceptions::NoSuchObjectInstance);
```

```
/**
 * Get all attribute/value assertions (i.e. <code>attribute=value</code>
 * pairs) supported by the current object instance.
 *
 * @param refresh   when true the attributes are first retrieved from the
 *                  external data source.
 * @exception NoSuchObjectInstance when the current object is invalid.
**/
Types::NVList getSupportedAVAs(in boolean refresh)
    raises (Exceptions::NoSuchObjectInstance);
```

```
/**
 * Get all operation names supported by the current object instance.  This
 * is based on static information, i.e the current state of the object is
 * not checked.  Use the function <code>getAvailableActions()</code> to
 * determine if an action is available in the object's current state.
 *
 * @exception NoSuchObjectInstance  when the current object is invalid.
 **/
Types::ActionIdList getSupportedActions()
    raises (Exceptions::NoSuchObjectInstance);
```

```
/**
 * Get all operation names supported by the current object instance <b>in
 * its current state</b>.
 *
 * @exception NoSuchObjectInstance  when the current object is invalid.
 **/
Types::ActionIdList getAvailableActions()
    raises (Exceptions::NoSuchObjectInstance);
```

```
/**
 * Sets the current handle's object pointer to the object's parent, meaning
 * that the current IOR is reused to refer to a different object. Nothing
 * is returned by this function. This function - together with
 * <code>moveTo()</code> allow a client to traverse/build up a
 * containment hierarchy without the need for any knowledge about the
 * model. As the model containment hierarchy is a tree hierarchy,
 * each object never has more than 1 parent and no object instance is
 * needed to uniquely identify the parent class.
 *
 * @exception NoSuchObjectInstance  when the current object is invalid or
 *                                  when the parent does not exist.
 **/
void moveToParent()
    raises (Exceptions::NoSuchObjectInstance);
```

```
/**
 * Returns the list of EntityIds of all children of the current object.
 *
 * @exception NoSuchObjectInstance when the current object is invalid.
 **/
Types::EntityIdSeq getChildren()
    raises (Exceptions::NoSuchObjectInstance);
```

/**
 * Sets the object's attributes.
 *
 * @param avas    the attributes to be set with their corresponding values.
 * @exception OperationNotSupported  when the current object is read-only.
 * @exception NoSuchObjectInstance   when the current object is invalid.
 * @return  the list of all attributes with their new values.
 **/
Types::NVList setAttributes(in Types::NVList avas)
  raises (Exceptions::OperationNotSupported,
    Exceptions::NoSuchObjectInstance);
```

```
/**
 * Executes the action identified by its action ID.
 *
 * @param action  the action ID.
 * @param params  the actions arguments.
 * @exception OperationNotSupported when the current object doesn't
 *            support this operation in its current state.
 * @exception NoSuchObjectInstance when the current object is invalid.
 * @return  A Result Table containing any output information.
 **/
Types::ResultTable executeAction(in Types::ActionId action,
                                 in Types::NVList params)
    raises (Exceptions::OperationNotSupported,
            Exceptions::NoSuchObjectInstance);
```

```
/**
 * Adds an object to the model.  The internal object pointer is not
 * changed.
 *
 * @param fdn   the Fully Distinguished Name of the object to be created.
 * @param avas  the list of attributes and corresponding values for the
 *              new object.
 *
 * @exception DuplicateObjectInstance  when the object with given FDN
 *                        already exists in the model.
 **/
void create(in Types::EntityId fdn,Types::AttributeValue[] avas)
  raises (Exceptions::DuplicateObjectInstance);
```

FIG. 40

```
/**
 * Deletes the object.
 *
 * @exception NoSuchObjectInstance when the current object is invalid.
 **/
void delete()
  raises (Exceptions::NoSuchObjectInstance);
```

```
/**
 * Releases the NameSpaceObject's internal object reference so that it
 * can be garbage collected when the namespace is destroyed.
 * (Not CORBA release)!
 **/
void releaseRef();
};
};
#endif
```

```
// Types.idl ifndef TYPES_IDL
define TYPES_IDL
#pragma prefix "corba.gem.alcatel.com"

module Types
{
    /**
     * A structure containing an attribute name with corresponding attribute
     * value of type <code>any</code>.
     **/
    struct AttributeValue
    {
        /** attribute name **/
        string attributeName;
        /** attribute value **/
        any val;
    };
    /**
     * A structure containing an attribute name with corresponding attribute
     * value of type <code>string</code>
     **/
    struct NameAndStringValue
    {
        /** attribute name **/
        string attributeName;
        /** attribute value **/
        string val;
    };
```

```
/**
 * A list of (name="string", value="any") tuples.
**/
typedef sequence<AttributeValue> NVList;

/**
 * A list of strings.
**/
typedef sequence<string> SList;

/**
 * A list of (name="string", value="string") tuples.
**/
typedef sequence<NameAndStringValue> NVSList;

/**
 * An EntityId is the unique identification of an object.
**/
typedef NVSList EntityId;
typedef sequence<EntityId> EntityIdSeq;

typedef string EntityType;

typedef string ActionId;
typedef sequence<ActionId> ActionIdList;
```

```
/**
 * Enumeration of supported filter types:
 * <ul>
 * <li><code>FT_PRESENCE</code> - whether given attribute is present in the
 *     object
 * <li><code>FT_ABSENCE</code> - wheter given attribute is absent in the
 *     object
 * <li><code>FT_EQ</code> - equality of attribute value
 * <li><code>FT_LT</code> - less than
 * <li><code>FT_GT</code> - greater than
 * <li><code>FT_LTEQ</code> - less than or equal
 * <li><code>FT_GTEQ</code> - greater than or equal
 * <li><code>FT_LIKE</code> - attribute value matching using wildcards
 * </ul>
 **/
enum FilterTypeEnum { FT_PRESENCE,FT_ABSENCE,FT_EQ, FT_LT,FT_GT,FT_LTEQ,
    FT_GTEQ,FT_CONTAINS,FT_LIKE };
```

```
/**
 * A structure describing the filtering condition for one attribute.
 **/
struct FilterItem
{
    /** the name of the attribute to apply the filter on **/
    string attr;
    /** the type of the filter (attribute presence or contents filtering) **/
    FilterTypeEnum type;
    /** the value when contents filtering is used **/
    any value;
};

/**
 * A filter expression: logical <code>AND</code> of <code>FilterItem</code>s.
 **/
typedef sequence<FilterItem> Filter;

/**
 * A record as defined in the relational database terminology.
 **/
struct Record
{
    /** unique record identification **/
    EntityId objectId;
    /** the values for the data columns **/
    sequence<any> fields;
    /** error code; empty string when no error **/
    string errorCode;
};
```

/**
 * A sequence of relational database table column names (header)
**/
typedef sequence<string> TableHeader;

/**
 * A collection of relational database records.
**/
typedef sequence<Record> Records;

typedef long ErrorCode;
```

```
/**
 * Generic error structure: an errorCode for language independence and an
 * optional description (language dependent).
 **/
struct Error
{
    string description;
    ErrorCode errorCode;
};

/** Command successful **/
const ErrorCode EC_NO_ERROR = 0;
const ErrorCode EC_INVALID_ENTITY_ID = 1;
const ErrorCode EC_ENTITY_NOT_FOUND = 2;
/** Command partially successful; see error codes in individual records **/
const ErrorCode EC_PARTIAL = 3;
/** Command failed; either no records, or error codes for individual records
    that failed (for different reasons) **/
const ErrorCode EC_FAILED = 4;
```

```
/**
 * A relational database table
 **/
struct ResultTable
{
    /** Table name **/
    string name;
    /** Global Command Error **/
    Error error;
    /**
     * (Unordered) list of column names representing the attributes of a
     * Managed Object.  The corresponding values are given in
     * <code>records</code>.  The Managed Object id is not part of the
     * header, it is always implicitly present as the <code>objectId</code>
     * in each record.
     **/
    TableHeader header;
    /**
     * (Unordered) list of values for the attributes given in
     * <code>dataNames</code>.  The sequence in <code>records</code>
     * corresponds to the sequence in <code>header</code>.
     **/
    Records records; // data column values (idem)
};
/**
 * Sequence of relational database tables.
 **/
typedef sequence<ResultTable> ResultTableSeq;
#endif
```

```
// Exceptions.idl ifndef EXCEPTIONS_IDL
define EXCEPTIONS_IDL pragma prefix "corba.gem.alcatel.com"

include <Types.idl> module Exceptions
{
   /**
    * Exception thrown when an object instance was not found in the model.
    **/
   exception NoSuchObjectInstance
   {
      / the identification of the object /
      Types::EntityId obj;
      / error message /
      string message;
   };
```

```
/**
 * Says it all...
 **/
exception OperationNotSupportedException
{
};

/**
 * Exception thrown when an the object instance already exists in the model.
 **/
exception DuplicateObjectInstance
{
    / the identification of the object /
    Types::EntityId obj;
    / error message /
    string message;
};

#endif
```

NETWORK NAVIGATOR INTERFACE SYSTEM AND METHOD

CROSS REFERENCE TO RELATED APPLICATIONS

This application incorporates by reference U.S. Patent Application entitled "ELEMENT MANAGER COMMON GATEWAY ARCHITECTURE SYSTEM AND METHOD", application Ser. No. 09/797,088, Mar. 1, 2001 by applicant Bart A Theeten.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention is related in the general area of object oriented programming and the definition of fine-grained models in situations where only coarse-grained models are available.

ABBREVIATIONS AND DEFINITIONS

To minimize the verbosity of this document, a variety of abbreviations and definitions will be provided to aid the reader. This information may be applicable to the prior art, the present invention, or some combination of the two. No assumption should be made regarding the applicability of this information except as referenced within the applicable preferred embodiment description of the present invention as given later in this document.

List of Abbreviations

The following acronyms will be used throughout this document:

AID Native Identifier for TL1 objects
AMC Alcatel Management Console
AMV ALMAP View (GUI Framework)
API Application Programming Interface
AS/ASM Alarm Surveillance Manager
ANS Alcatel Network Systems
ASN.1 Abstract Syntax Notation 1
CGA Common Gateway Architecture
COBRA Common Object Request Broker Architecture
CMIP Common Management Information Protocol
CMISE Common Management Information Service Element
CRB Change Review Board
DDTS Fault Report System
DII Dynamic Invocation Interface
DME Distributed Management Environment
DN Distinguished Name (name in a NVP)
EML Element Management Layer
EMS Element Management System
FAD Functional Access Domain
FDN Fully Distinguished Name
GDMO Guidelines for the Definition of Managed Objects
GEM Generic Element Manager
GP Gateway/Proxy
GUI Graphical User Interface
GW Gateway
HPOV HP Open View
IDL Interface Description Language
IDL Interface Description Language
IM Information Model
IOR Interoperable object Reference
IP Internet Protocol
LIT Local Integration Test
LOC Lines of Code
LTN Local Transport Networks
MIB Management Information Base
MSAN Multi Service Access Node
NE Network Element
NML Network Management Layer
NMS Network Management System
NVP Name-Value Pair
OAD Object Access Domain
OMG Object Management Group
Os Operations System (e.g. Network Management Application)
OVE Approved instructions for engineering activities
PNM Physical Network Manager
PY Person Years
Q3 An object-oriented network management protocol
RDN Relative Distinguished Name
RTC Real Time Clock
SDH Synchronous Digital Hierarchy
SIT System Integration Test
SITC SIT completed
SMF System Management Framework
SNMP Simple Network Management Protocol
SONET Synchronous Optical Network
SQL Structured Query Language
SVT System Validation Test
SW Software
TLD Top Level Design
TL1 Transaction Language 1
UML Unified Modeling Language
X.25 A communications protocol These acronyms must be interpreted within their context as describing either the prior art (in some contexts) or the present invention and its embodiments. Some terms will apply to both the prior art and the present invention while others may apply to one or neither of these.

Definitions

The following definitions will be used throughout this document in describing the prior art as well as the present invention and its embodiments:

Hierarchical model—an object oriented model in which parent-child relationships are defined. Reference FIG. 1 (0101) for a typical example of this model.

Coarse-grained model—a semi-object-oriented model in which there is only a very limited amount of object instances. A coarse-grained model typically only defines a limited number of object classes and deals with a very limited number of object instances (tens of objects). Reference FIG. 1 (0102) for a typical example of this model.

Fine-grained model—an object-oriented model in which there is an object instance for each entity in the problem domain. A fine-grained model typically defines an object class for each entity type in the problem domain and deals with lots of object instances (thousands to millions of objects). Reference FIG. 1 (0103) for a typical example of this model.

Facade object—an object that acts as a front (or shell) for dispatching requests to an actual modeled object. A facade object is the key towards the definition of coarse-grained modules.

Fully Distinguished Name—a unique identifier for objects in hierarchical object modules. A FDN is a sequence of Relative Distinguished Names (RDNs). An RDN is a name-value pair (NVP) in which the name is commonly referred to as the Distinguished Name (DN). Each child of the same parent has a unique RDN. In other words, each RDN is unique within its parent's context.

Object View—the definition of the (sub)set of attributes and the (sub)set of operations visible on the object. Different views on the same object have a different set of attributes and/or a different set of operations available on the object.

1. Background of the Invention

The present invention is related in the general area of object oriented programming and the definition of fine-grained models in situations where only coarse-grained models are available. In these situations, the prior art generally teaches a strongly typed interface which requires the client and server to be modified for each change in the IDL interface. This is in part because typical object oriented interfaces do not support multiple views on the same modeled object.

2. Description of the Prior Art

Typical object oriented frameworks such as CORBA allow static interface discovery per object class, but do not permit a dynamic interface per object instance. Thus, the prior art teaches that while a framework of views may be generated, these views are generally static in nature.

Additionally, the prior art provides no mechanism of browsing and/or manipulating a model view. These limitations make it difficult if not impossible to traverse a modeled object and perform inquiry and/or manipulation operations on that object.

OBJECTS OF THE INVENTION

Accordingly, the objects of the present invention are (among others) to circumvent the deficiencies in the prior art and affect the following objectives:

(1) To permit multiple views to be supported in an object oriented framework.

(2) To permit browsing and/or manipulation of modeled object through a variety of coarse-grained and/or fine-grained model views.

(3) Within a network management context, to utilize fine-grained views to enable enhanced network element management functions.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

Overview

As illustrated in FIG. 2 (0200), the present invention details a network navigator system and method incorporating a client/server (0210, 0220) architecture in which a network coarse-grained model (or single object) (NameSpaceObject) (0211) is used to browse/manipulate a fine-grained object model (0221). The disclosed invention permits a client application (0210) to discover the detailed interface provided by each object instance in the fine-grained model (0221).

A client application wishing to invoke an operation on a server-side object first obtains an object reference (IOR) (0231) to a NameSpaceObject instance (0241). Each NameSpaceObject instance (0241) stores a pointer (0251) to an object in the fine-grained model (0221). The NameSpaceObject interface (0241) provides operations to move this pointer around in a hierarchical model (0101). Once the pointer (0251) is set to reference a certain object in the fine-grained model (0221), this object becomes the target for all further operations. The available operations include object contents discovery/manipulation (FIG. 4, (0421)), object interface discovery (FIG. 4, (0422)), and operation invocation (FIG. 4, (0423)).

Exemplary Application Overview

As illustrated in FIG. 3, the present invention may have application in situations where there are one or more telecommunications networks (0310, 0320) that may or may not contain equipment from different vendors. The network equipment elements (NE) used within these networks (0315, 0316, 0325, 0326) may take many forms, including but not limited to switch gear, multiplexers, and the like. These network elements (0315, 0316, 0325, 0326) are generally under control of one or more computer systems (0311, 0321) that are controlled by computer software (0312, 0322) that may be stored on a variety of storage media. This computer software generally takes the form of one or more network element managers (0313, 0314, 0323, 0324) that control and monitor the network elements (0315, 0316, 0325, 0326) that comprise constituent components of the telecommunication networks (0310, 0320).

The present invention can in some preferred embodiments deal specifically with implementations of the network element manager (0313, 0314, 0323, 0324) as they relate to the overall control and monitoring of the various network elements (0315, 0316, 0325, 0326) within the context of one or more telecommunications networks (0310, 0320). In this context the ability to interrogate and manipulate generic network elements (0315, 0316, 0325, 0326) within this generalized telecommunications framework is the target function of the present invention applied embodiment.

Network elements (NE) (0315, 0316, 0325, 0326) as illustrated in FIG. 3 generally make use of many different communication protocols. This diversity in communications protocols increases the difficulty and time to customize a common network element manager system (EMS) (0313, 0314, 0323, 0324) for every network element using a different protocol in the system. For example, incorporating the individual protocols within the EMS generally increases the overall subsystem complexity, increases code size, probability of software error/failure, and compilation time.

BRIEF DESCRIPTION OF THE DRAWINGS

For a fuller understanding of the advantages provided by the invention, reference should be made to the following detailed description together with the accompanying drawings wherein:

FIG. 8 illustrates an exemplary minimal source code implementation of an ObjectManager interface.

FIGS. 30–41 illustrate an exemplary source code implementation of an exemplary embodiment of a network navigator interface;

FIGS. 42–48 illustrate an exemplary TYPEs definition file that may be incorporated in a typical network navigator interface (see FIG. 30);

FIGS. 49–50 illustrate an exemplary EXCEPTIONs definition file that may be incorporated in a typical network navigator interface (see FIG. 30).

DESCRIPTION OF THE PRESENTLY PREFERRED EXEMPLARY EMBODIMENTS

Figure 1:
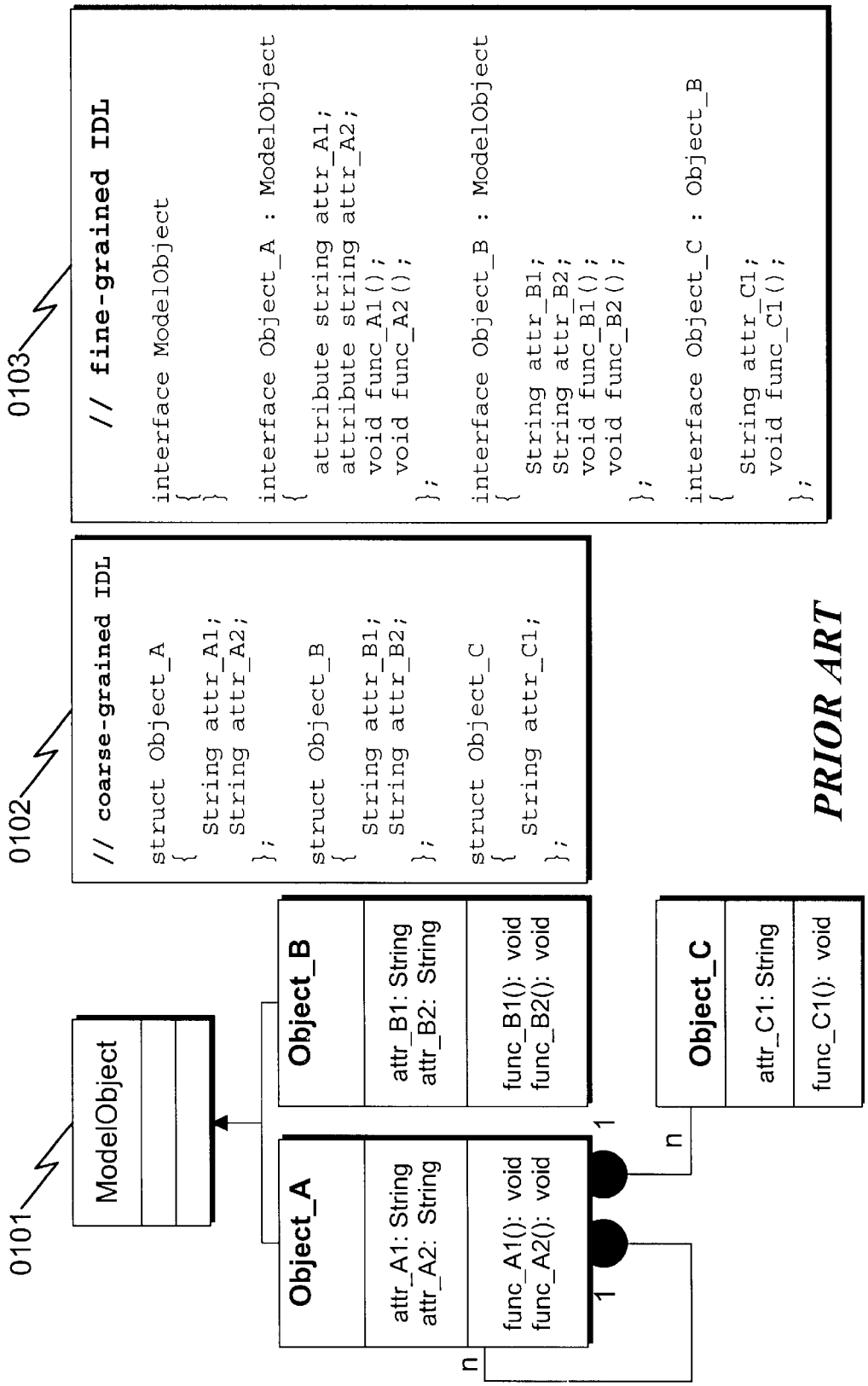
FIG. 1 illustrates prior art examples of coarse-grained and fine-grained models.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a NETWORK NAVIGATOR INTERFACE SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Definitions

Throughout the discussion in this document the following definitions will be utilized:

System Blocks/Procedural Steps Not Limitive

The present invention may be aptly described in terms of exemplary system block diagrams and procedural flowcharts. While these items are sufficient to instruct one of ordinary skill in the art the teachings of the present invention, they should not be strictly construed as limiting the scope of the present invention. One skilled in the art will be aware that system block diagrams may be combined and rearranged with no loss of generality, and procedural steps may be added or subtracted, and rearranged in order to achieve the same effect with no loss of teaching generality. Thus, it should be understood that the present invention as depicted in the attached exemplary system block diagrams and procedural flowcharts is for teaching purposes only and may be reworked by one skilled in the art depending on the intended target application.

Personal Computer Not Limitive

Throughout the discussion herein there will be examples provided that utilize personal computer (PC) technologies to illustrate the teachings of the present invention. The term 'personal computer' should be given a broad meaning in this regard, as in general any computing device may be utilized to implement the teachings of the present invention, and the scope of the invention is not limited just to personal computer applications.

Internet/Intranet Not Limitive

Throughout the discussion herein the terms Internet and Intranet will be used generally to denote any network communication system or environment. Generally the term Intranet will denote communications that are local to a given system or user, and Internet will describe communications in a more distant local. One skilled in the art will recognize that these terms are arbitrary within the contexts of modern communication networks and in no way limitive of the scope of the present invention.

The present invention specifically anticipates that in some implementations the GUI development framework (and/or its runtime component) will communicate with the data used to drive the GUI over the Internet. Thus, the application driving the user interface may reside on one computer system and the data used for presentation and control may be contained somewhere else on another computer system and be accessed via any number of networking protocols.

Application Programming Interface (API) Not Limitive

While the present invention may be in part implemented using standard Application Programming Interfaces (APIs) such as Software Development Kits (SDKs) and the like, there is no requirement that the present invention be implemented using these tools.

Operating System Not Limitive

Additionally, while the present invention may be implemented to advantage using a variety of Microsoft® operating systems (including a variety of Windows™ variants), nothing should be construed to limit the scope of the invention to these particular software components. In particular, the system and method as taught herein may be widely implemented in a variety of systems, some of which may incorporate a graphical user interface. Some examples of these include HP-UX™, LINUX™, SOLARIS, and UNIX™ (and its variants), among others.

Data Structures Not Limitive

The present invention may be embodied in a variety of data structures in some preferred embodiments. However, the form of such data structures as described herein is only exemplary. One skilled in the art would quickly realize that a wide variety of other data structures could be used equivalently in this application. Therefore, no data structure contained herein should be interpreted as limiting the scope of the present invention.

CORBA Not Limitive

The present invention may be implemented using the CORBA object oriented framework in some preferred embodiments. However, the form of implementation described herein is only exemplary. One skilled in the art would quickly realize that a wide variety of other object oriented frameworks could be used equivalently in this application. Therefore, no framework contained herein should be interpreted as limiting the scope of the present invention.

Overview (0200)

Figure 2:
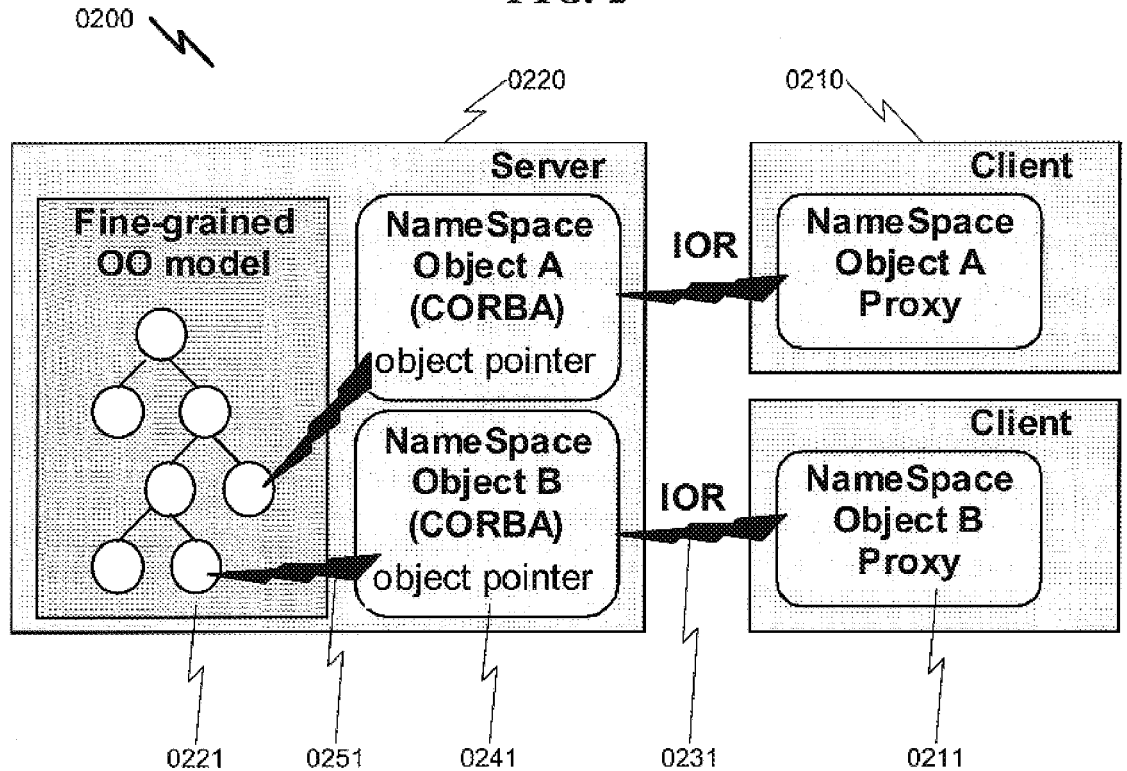
FIG. 2 illustrates an exemplary system block diagram of an exemplary embodiment of the present invention.
Figure 3:
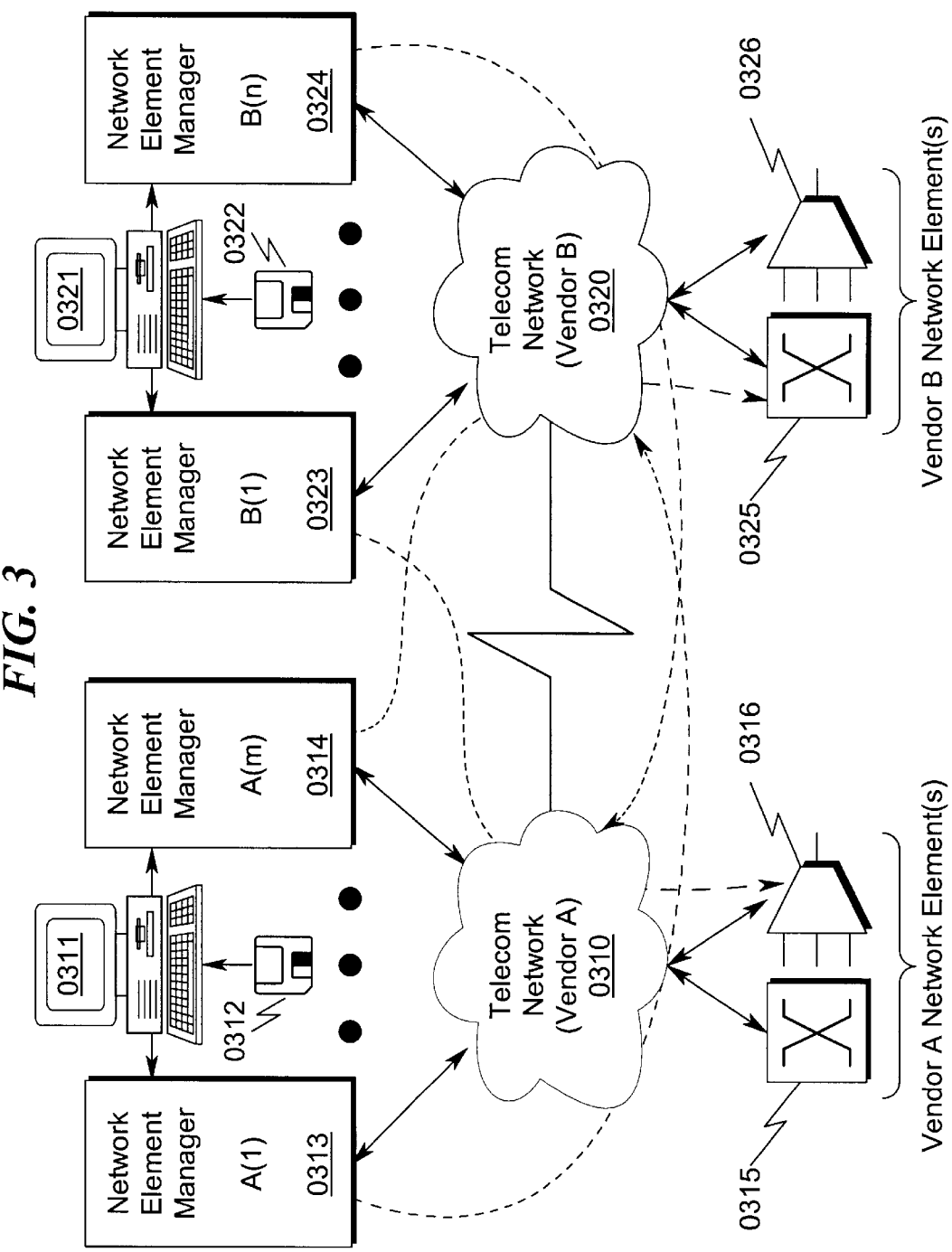
FIG. 3 illustrates an exemplary architectural overview of how the present invention may interface into an integrated multi-vendor network management system incorporating computer monitoring, configuration, and the like via software control.

Referencing FIG. 2 (0200), the present invention in some embodiments uses a coarse-grained CORBA model, actually just a single CORBA object (NameSpaceObject), to access a fine-grained non-CORBA object model. Furthermore, it allows a client application to discover the detailed interface provided by each object instance in the fine-grained model.

A client application wishing to invoke an operation on a server-side object first obtains a CORBA object reference (IOR) to a NameSpaceobject instance. Each NameSpaceObject instance stores a pointer to an object in the fine-grained model (FIG. 2 (0200)). The NameSpaceObject interface provides operations to move this pointer around in a hierarchical model. Once the pointer is set to reference a certain object in the fine-grained model, this object becomes the target for all further operations. The available operations include object contents discovery/manipulation, object interface discovery and operation invocation.

Exemplary Application Overview (0700)

Figure 7:
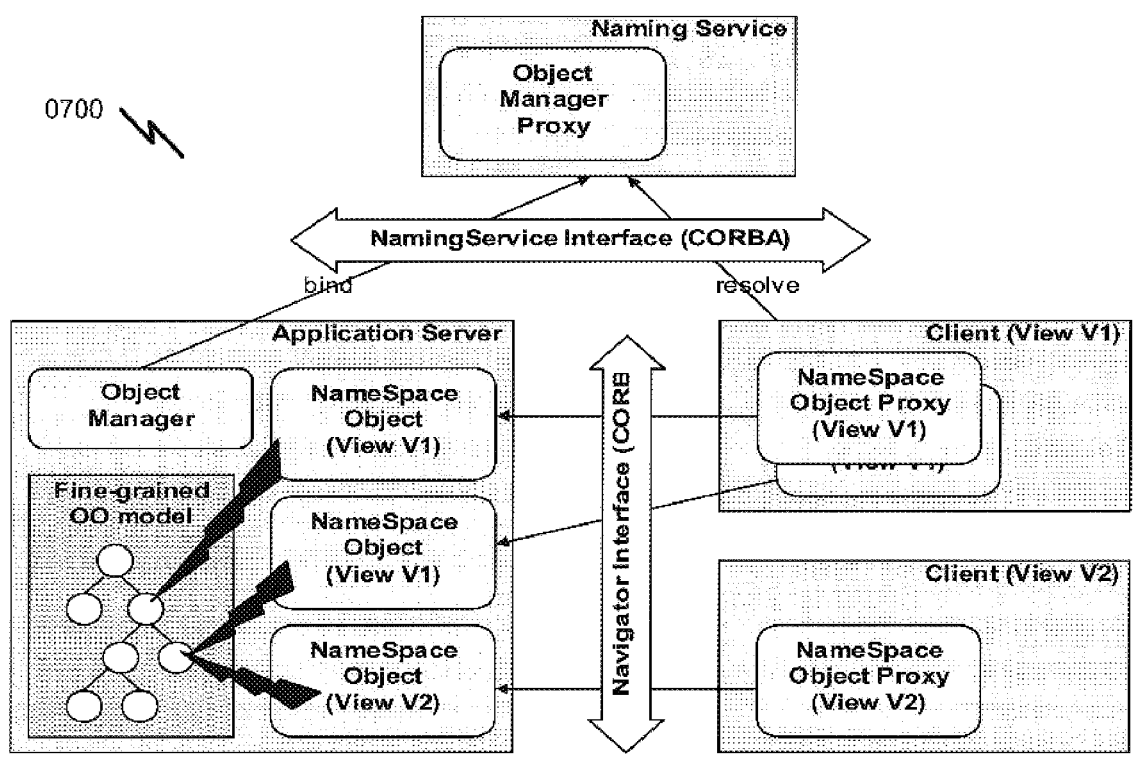
FIG. 7 illustrates an exemplary system block diagram of an embodiment of the present invention used in a typical application.
Figure 18:
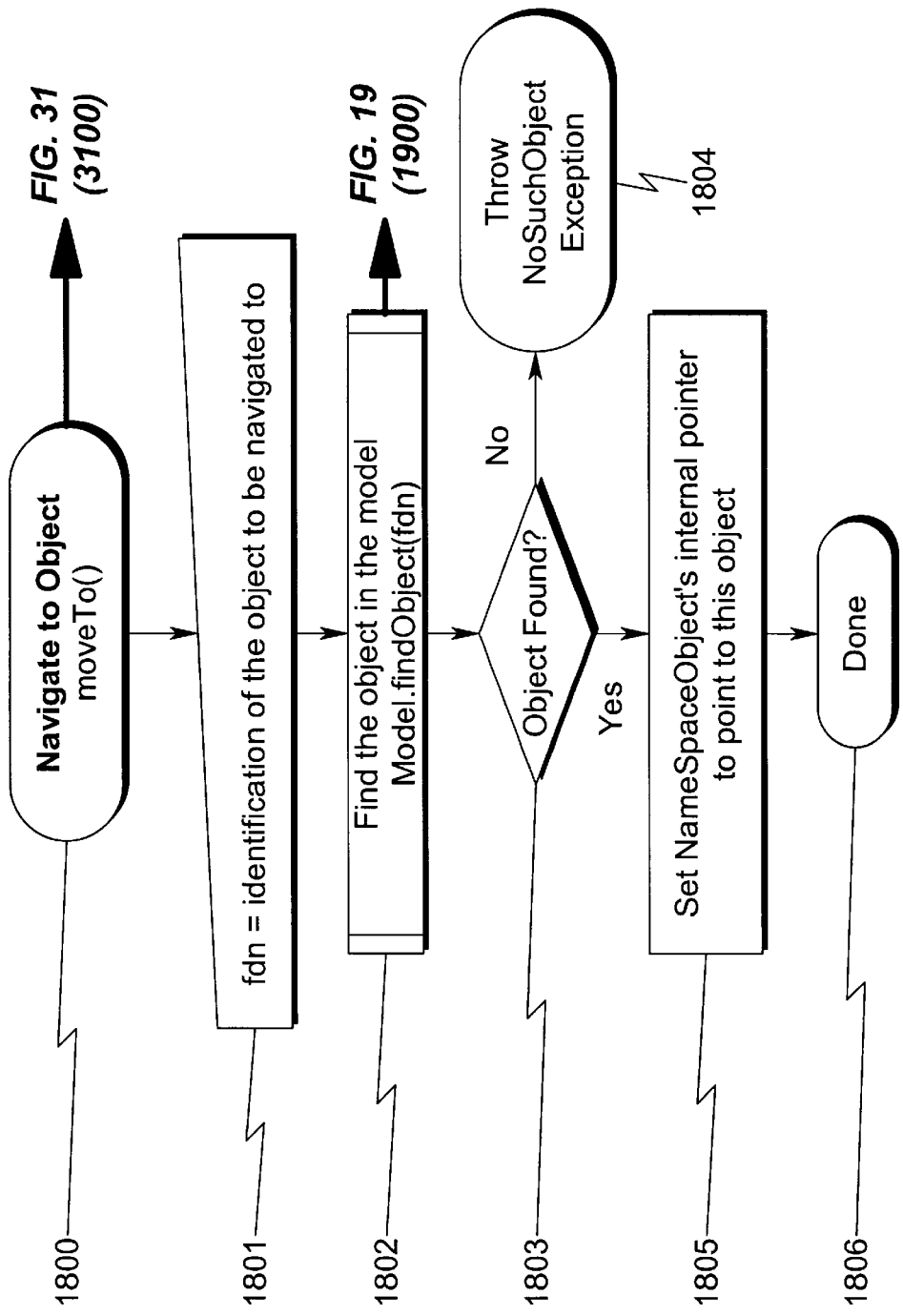
FIG. 18 illustrates an exemplary system flowchart illustrating a Navigation to Object function that may be useful within the context of the present invention.
Figure 19:
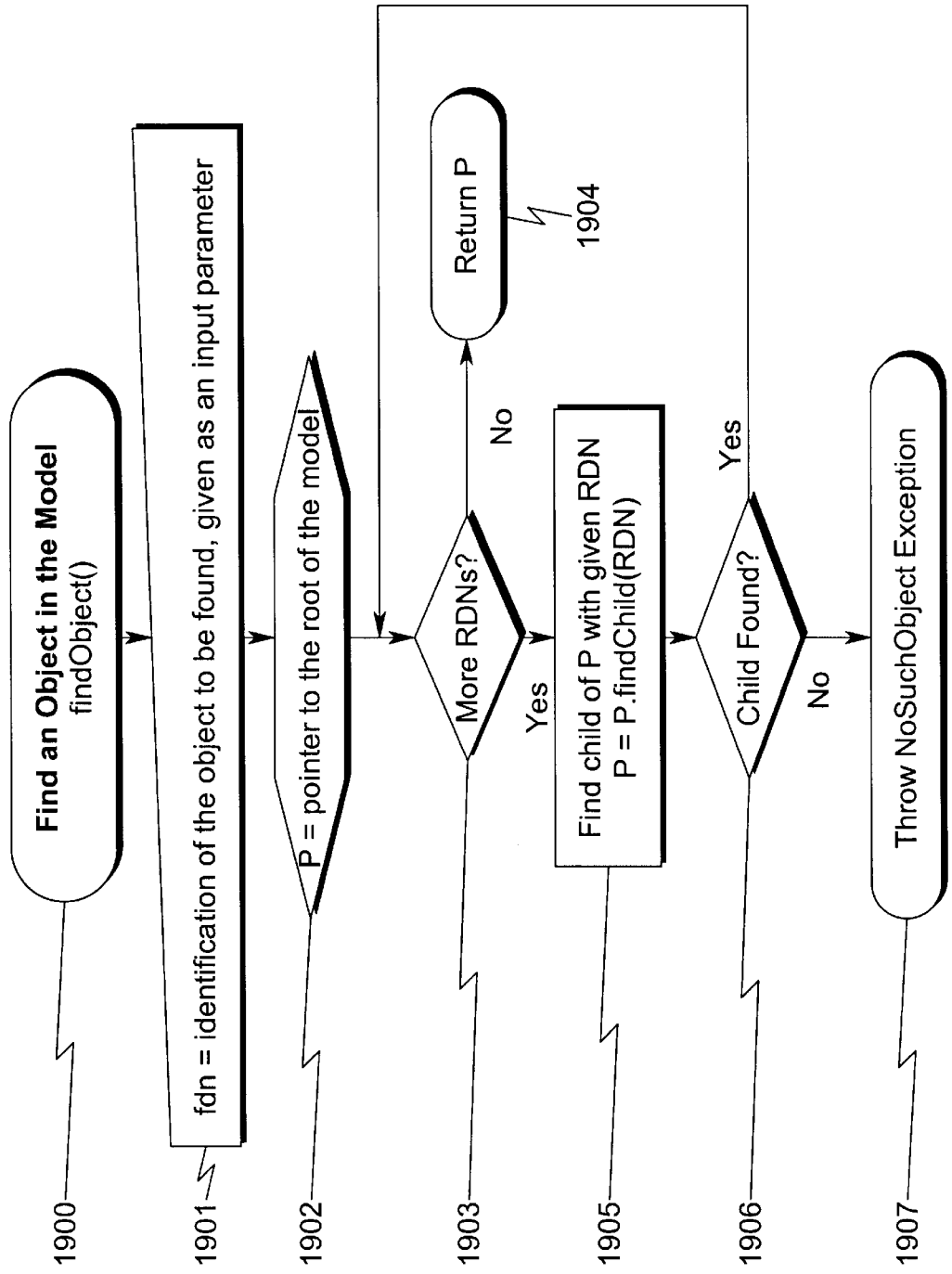
FIG. 19 illustrates an exemplary system flowchart illustrating a Find an Object in the Model function that may be useful within the context of the present invention.
Figure 20:
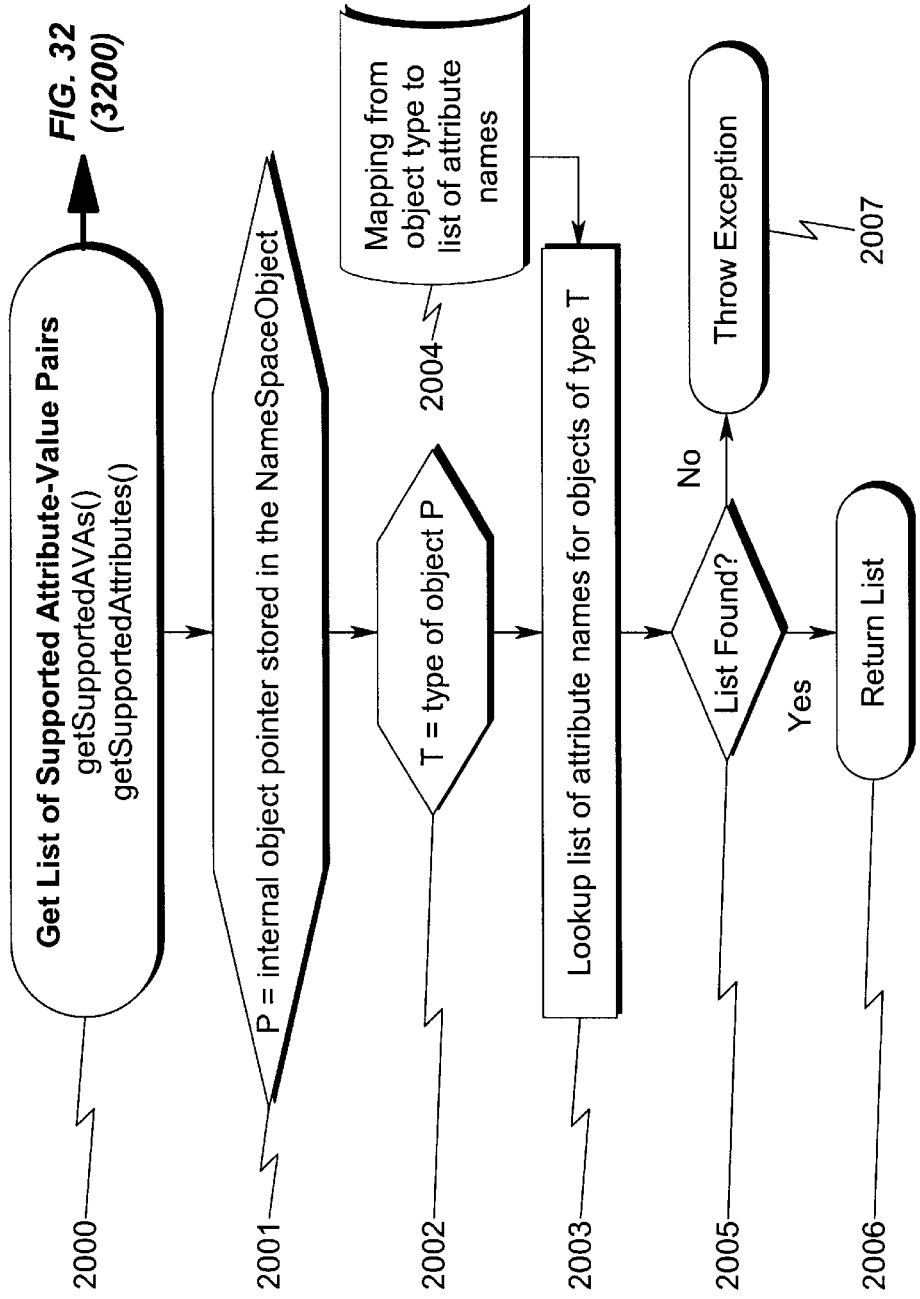
FIG. 20 illustrates an exemplary system flowchart illustrating a Get List of Supported Attribute-Value Pairs function that may be useful within the context of the present invention.
Figure 21:
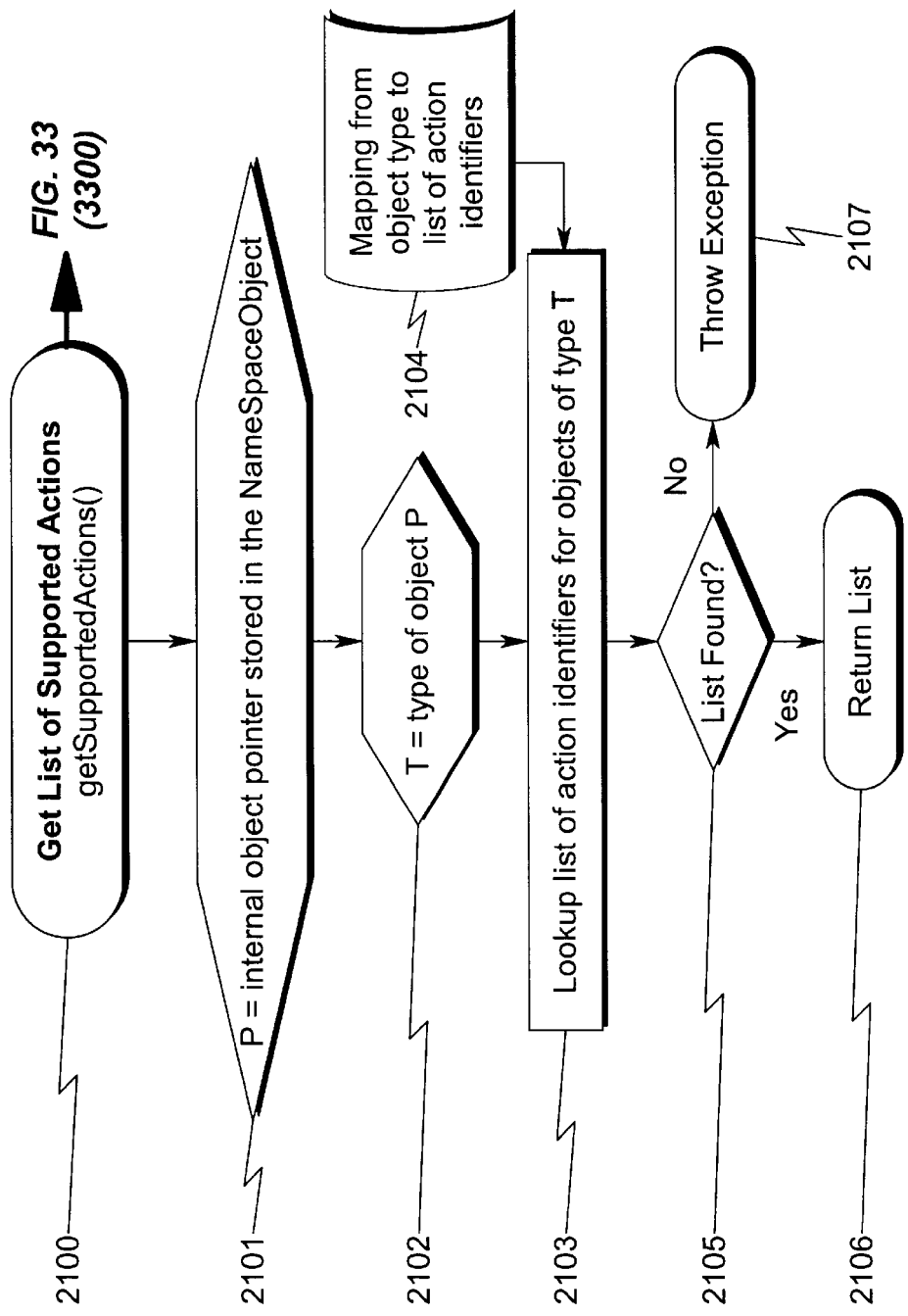
FIG. 21 illustrates an exemplary system flowchart illustrating a Get List of Supported Actions function that may be useful within the context of the present invention.
Figure 22:
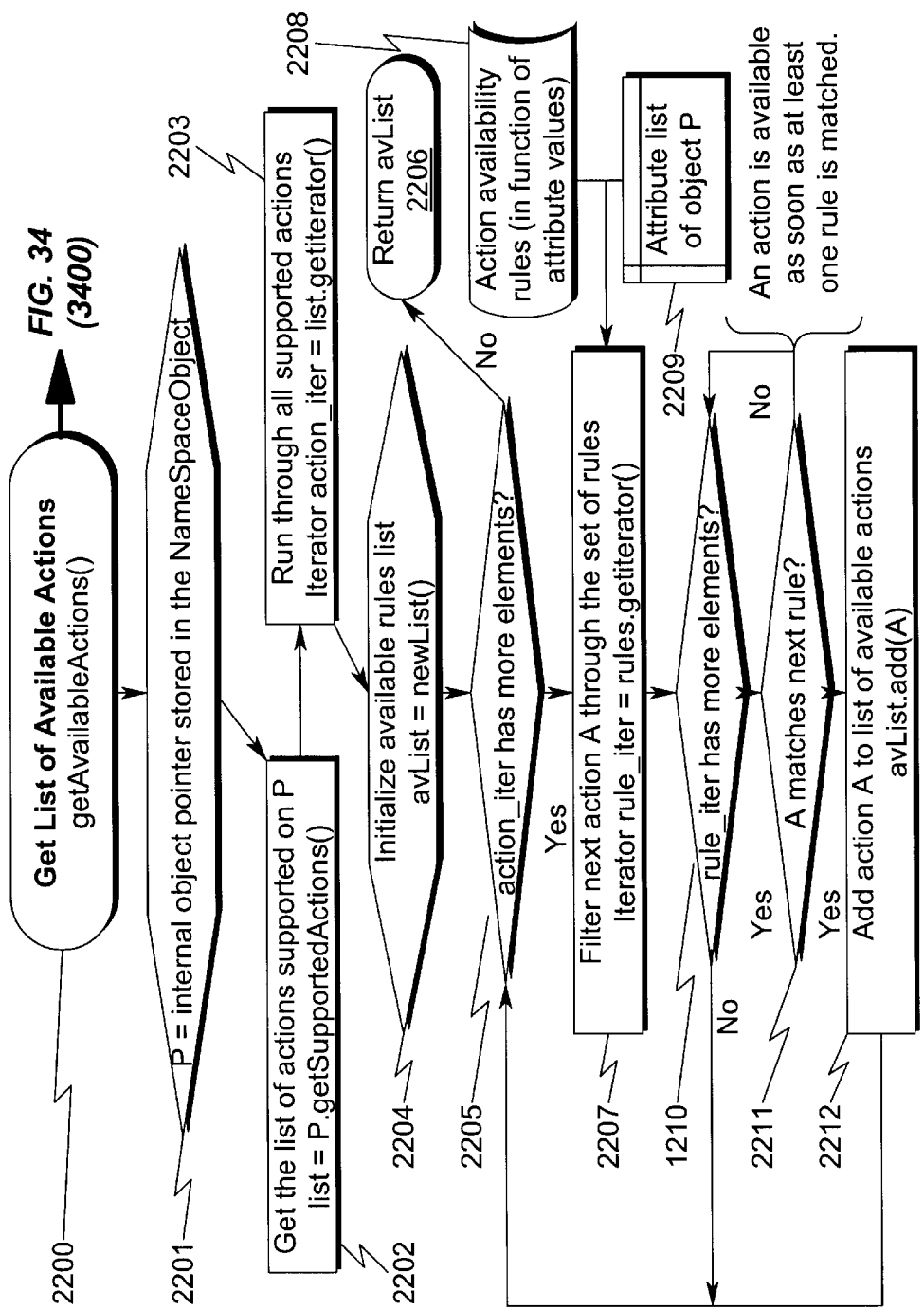
FIG. 22 illustrates an exemplary system flowchart illustrating a Get List of Available Actions function that may be useful within the context of the present invention.
Figure 23:
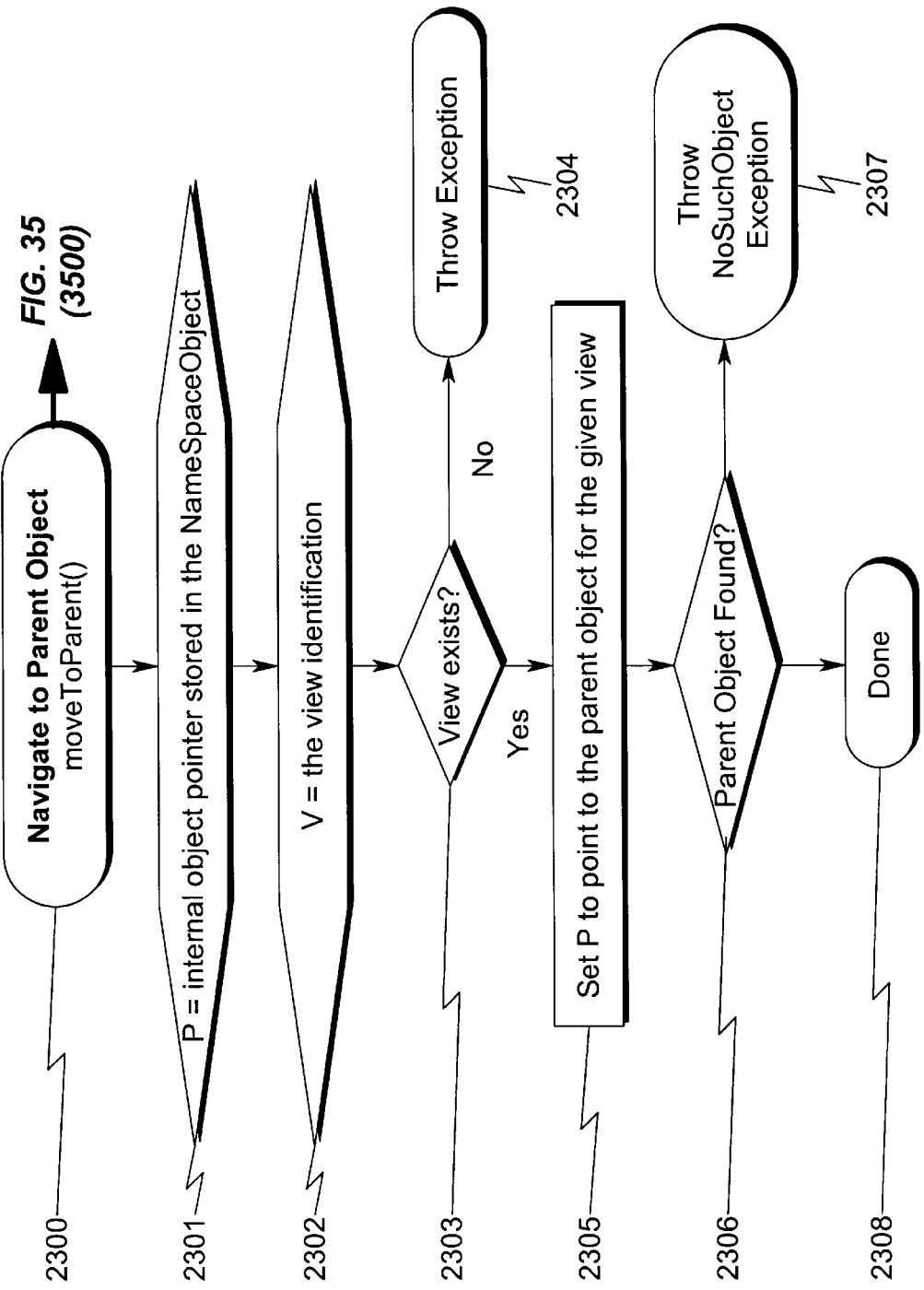
FIG. 23 illustrates an exemplary system flowchart illustrating a Navigate to Parent Object function that may be useful within the context of the present invention.
Figure 24:
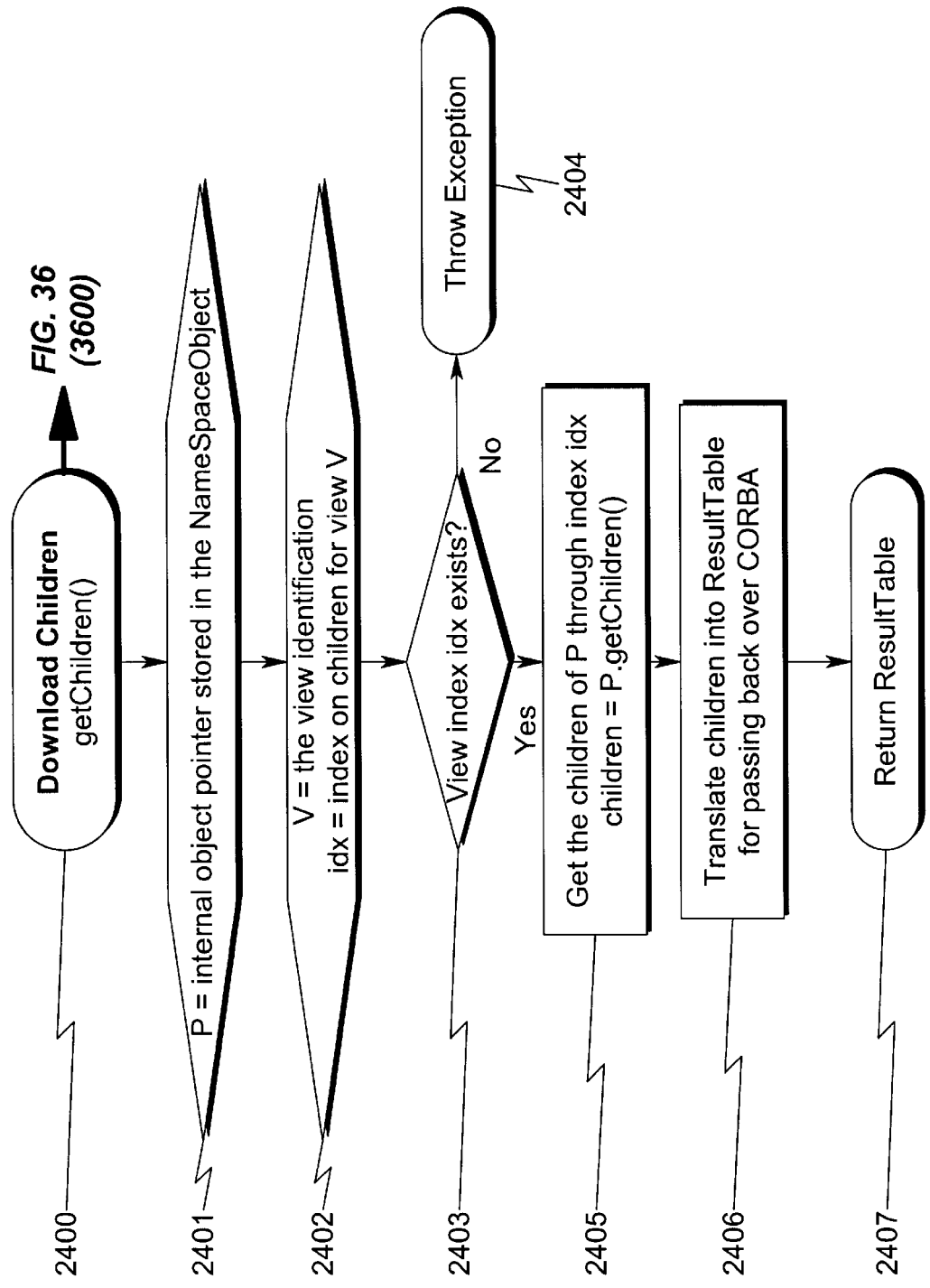
FIG. 24 illustrates an exemplary system flowchart illustrating a Download Children function that may be useful within the context of the present invention.
Figure 26:
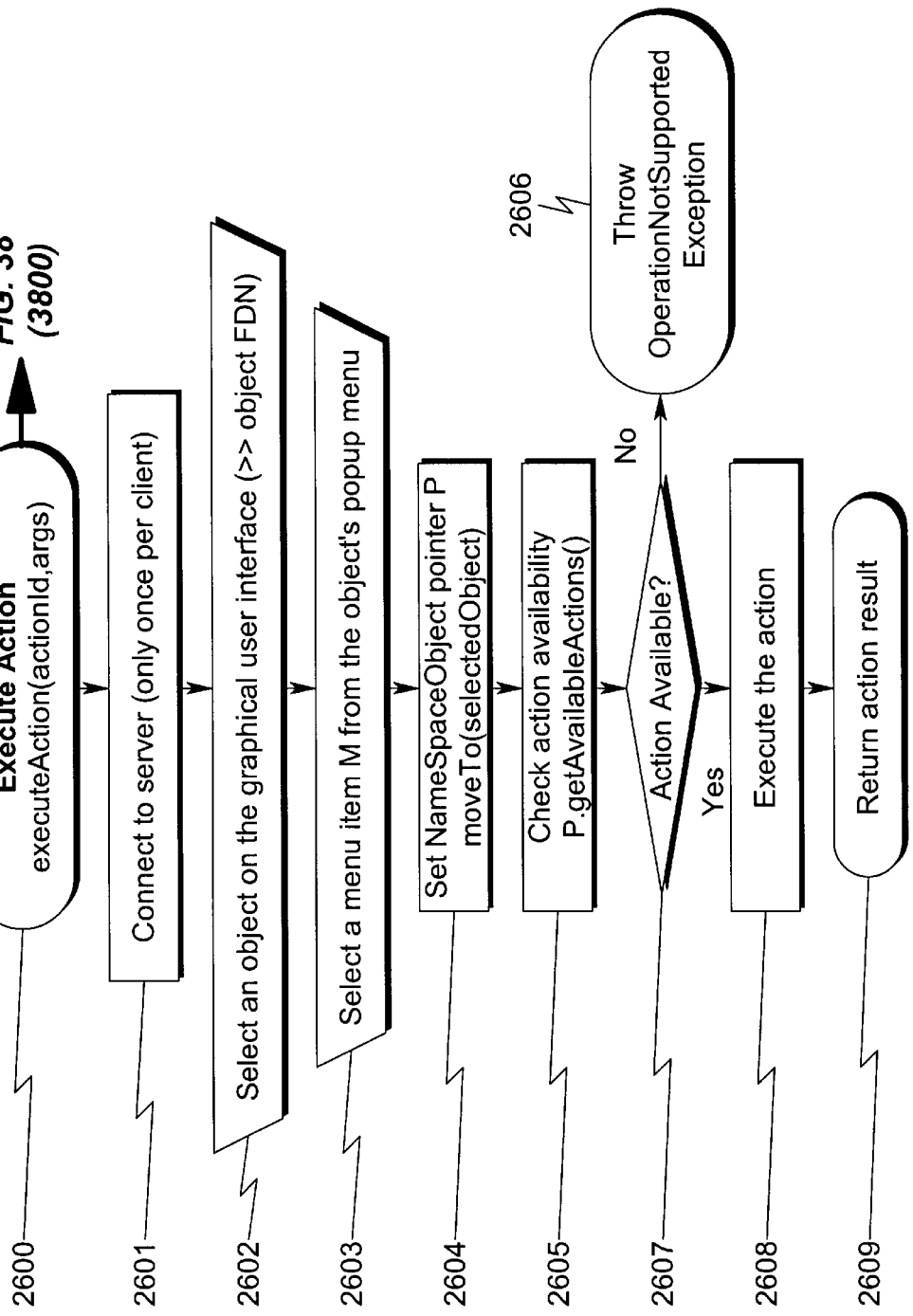
FIG. 26 illustrates an exemplary system flowchart illustrating an Execute Action function that may be useful within the context of the present invention.

Different views on the same model are provided through different NameSpaceObject implementations (FIG. 7 (0700)). The particular implementation of the NameSpaceObject defines all of the following:

- the hierarchical organization of the model (through the operations moveTo( ) (see FIG. 18 (1800)), moveToParent( ) (see FIG. 23 (2300)), getChildren( ) (see FIG. 24 (2400)) and getChildInstances( );
- the operations supported by a particular object instance (through the operations getSupportedActions( ) (see FIG. 21 (2100)), getAvailableActionso (see FIG. 22 (2200)) and executeAction( ) (see FIG. 26 (2600)));
- the (sub)set of attributes supported by the object instance (through the operations getSupportedAttributes( ) (see FIG. 20 (2000)) and getSupportedAVAs( ) (see FIG. 20 (2000))).

Exemplary Navigator Interface Application (0700)

It is now instructive to detail an exemplary application context for the Navigator interface. First, the supporting architecture is presented in FIG. 7 (0700). There are three sub-systems in the architecture:

1. The Naming Service—this sub-system is the standard OMG Naming Service. This component allows a client application to look up the IOR (object reference) of a CORBA object instance by name resolution (resolve operation). The application server populates the Naming Service by means of bind operations. The Naming Service plays an important role in making distributed client/server applications location independent.
2. The Application Server—this sub-system stores the fine-grained object model and implements all object and inter-object behavior. It also contains the Object Manager, which is the component a client needs to contact to obtain a reference to a newly instantiated view-specific NameSpaceObject. There is only one instance of the Object Manager and this instance is registered with the Naming Service. All NameSpaceObjects are allocated in the Application Server's address space.
3. The Clients—these are the components that wish to discover/manipulate the server's model. Each client stores an arbitrary number of NameSpaceObject proxies, which are just stubs (generated by the CORBA infrastructure) for dispatching requests to (remote) CORBA object instances. Typically, a client stores a small number of proxies.

A minimal Object Manager's interface is given in the exemplary source code listing of FIG. 8 (0800).

The NameSpaceObject stores a pointer into the fine-grained model. Therefore, each object in the model needs to implement the same interface (ModeledObject). In C++, all objects in the model would extend the same class; in Java, they would either implement the same Java interface or extend the same Java class.

Exemplary Navigator Interface Data Flows (0900–1400)

Overview

The data interactions between an exemplary client, naming service, object manager and NameSpaceObject are illustrated in FIGS. 9–14 and will now be briefly discussed.

Application Server Initialization (0900)

Figure 9:
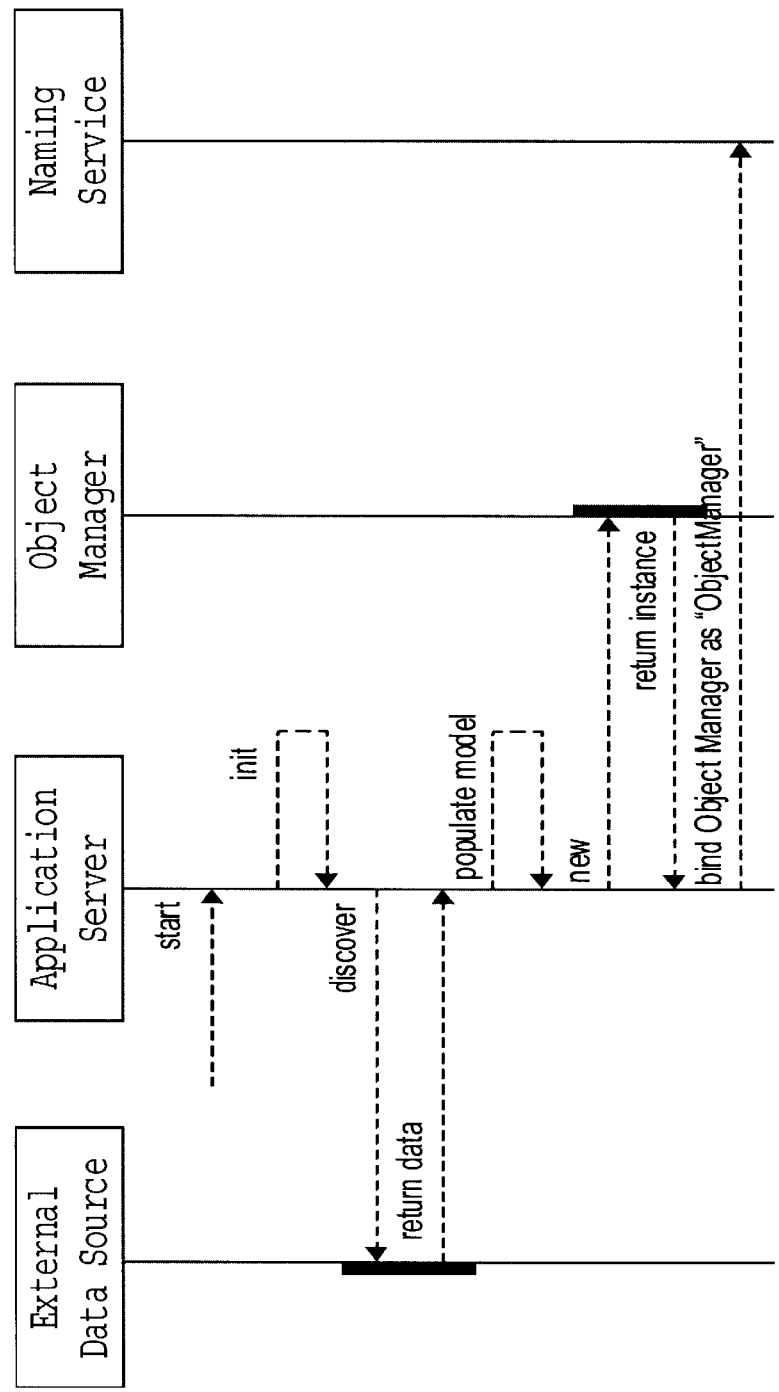
FIGS. 9–14 illustrate an exemplary data flows between various components of a system utilizing the teachings of the present invention.

The exemplary data flow of FIG. 9 (0900) illustrates the interactions between the Application Server, the Naming Service and an unspecified External Data Source (e.g., Network Element) providing access to the information the data model is populated with.

Client Initialization (2000)

Figure 10:
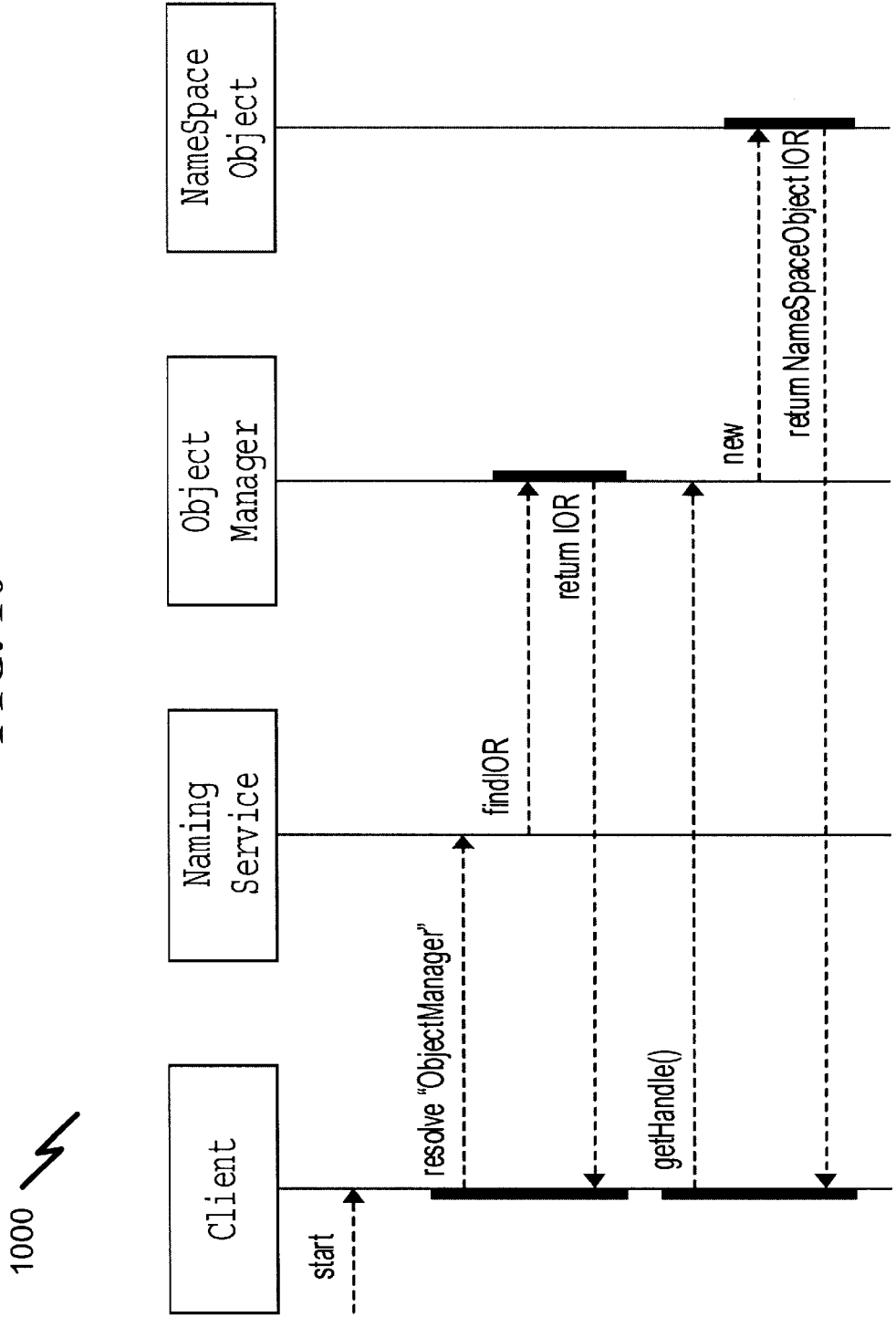

The exemplary data flow scenario of FIG. 10 (1000) illustrates interactions between Client, server (ObjectManager) and Naming Service to obtain the first NameSpaceObject reference.

Model Browsing (2100)

Figure 11:
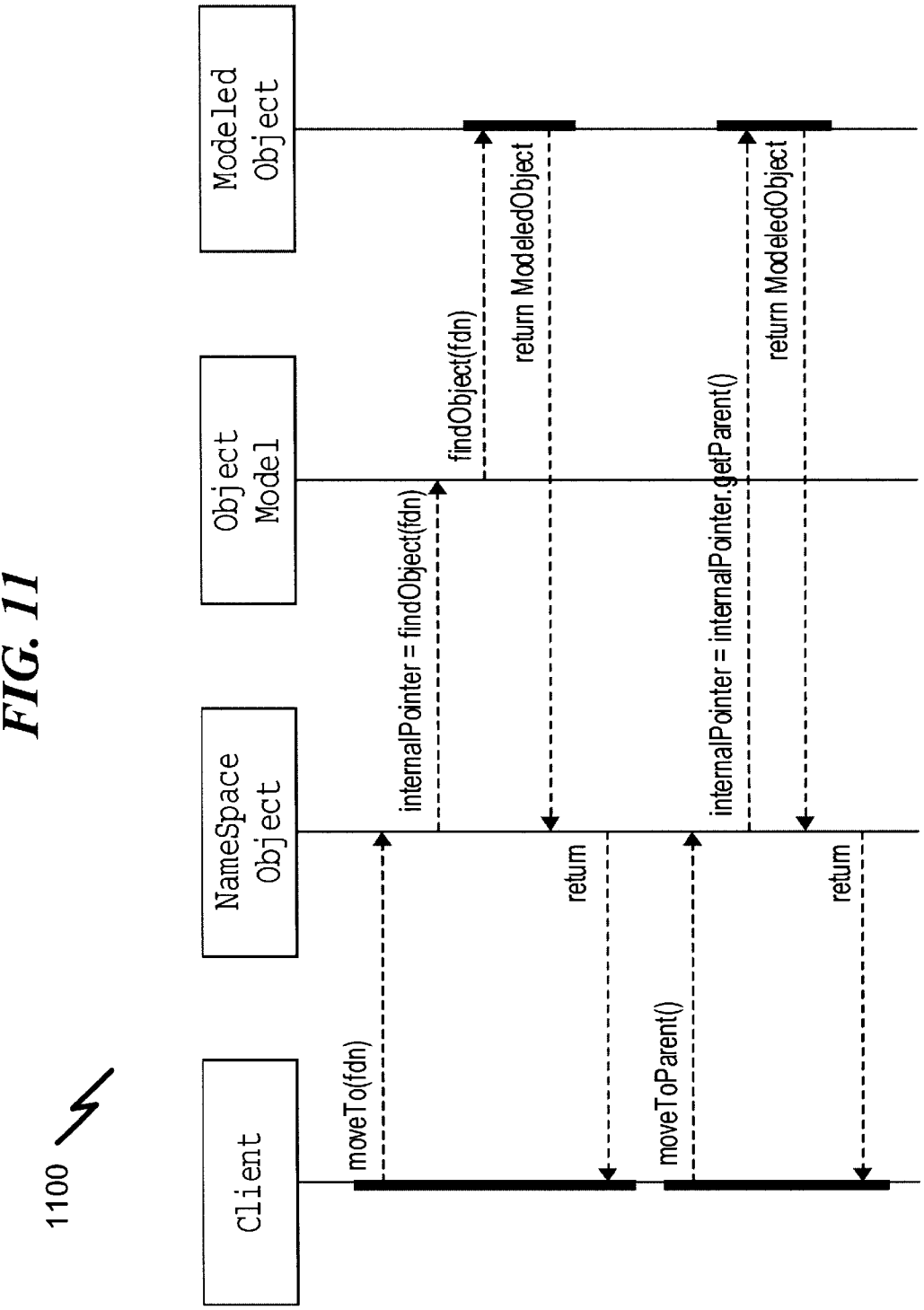

The exemplary data flow scenario of FIG. 11 (1100) assumes the client already obtained a reference to a NameSpaceObject according to the previous scenario. This scenario shows the interactions between client, NameSpaceObject and server (ObjectModel and ModeledObject) for operations that move the internal object pointer around in the model.

Interface Discovery (1200)

Figure 12:
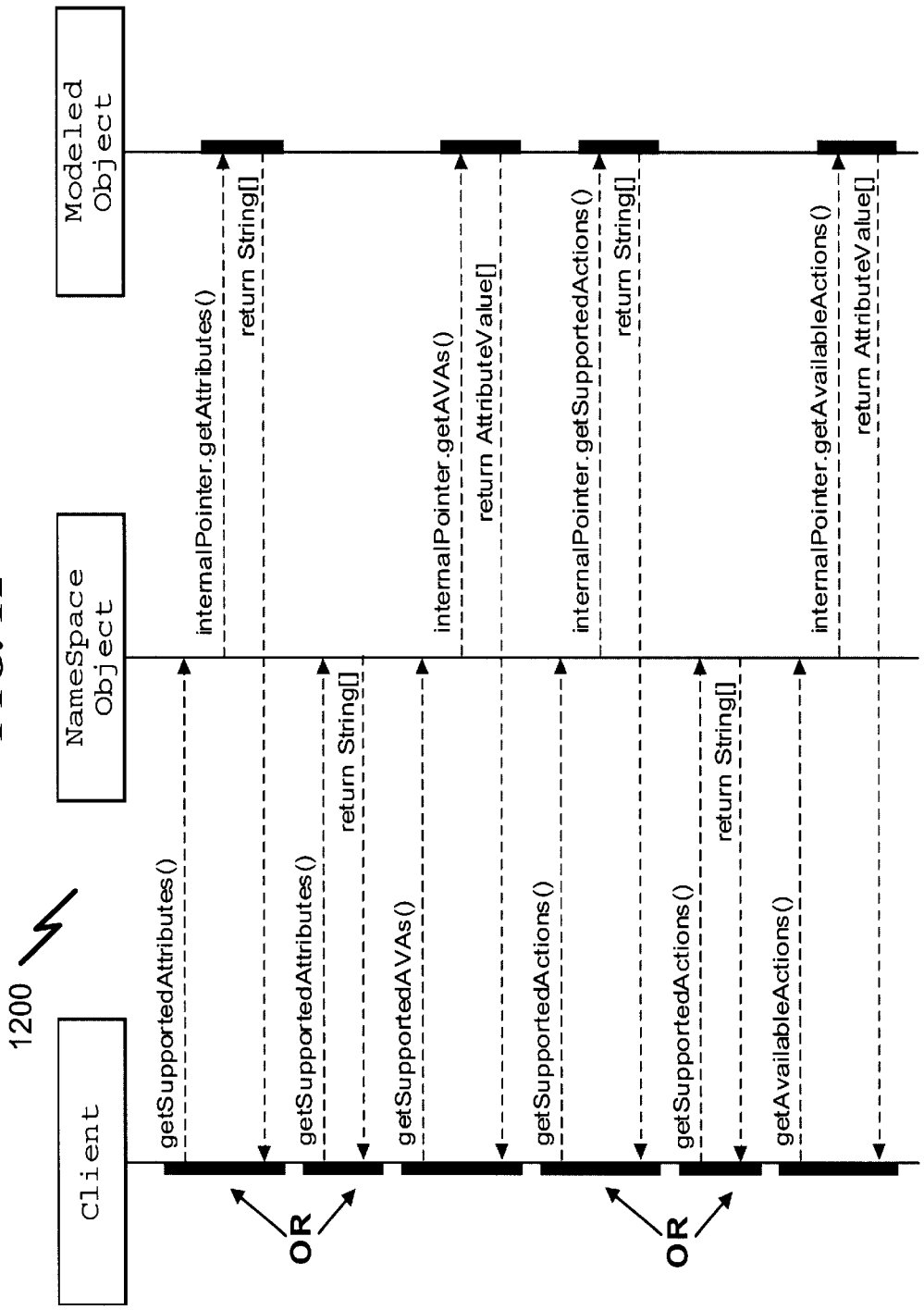

The exemplary data flow scenario of FIG. 12 (1200) assumes the client already obtained a reference to a NameSpaceObject according to the client initialization scenario and that the NameSpaceObject's internal pointer has already been set to point to the target modeled object (see previous scenario). This scenario shows the interactions between Client, NameSpaceObject and Server (ModeledObject) for operations that discover the target object's detailed interface. The actual interface definition is typically described in view-specific configuration files or hard-coded in the target modeled objects.

Action Execution (1300)

Figure 13:
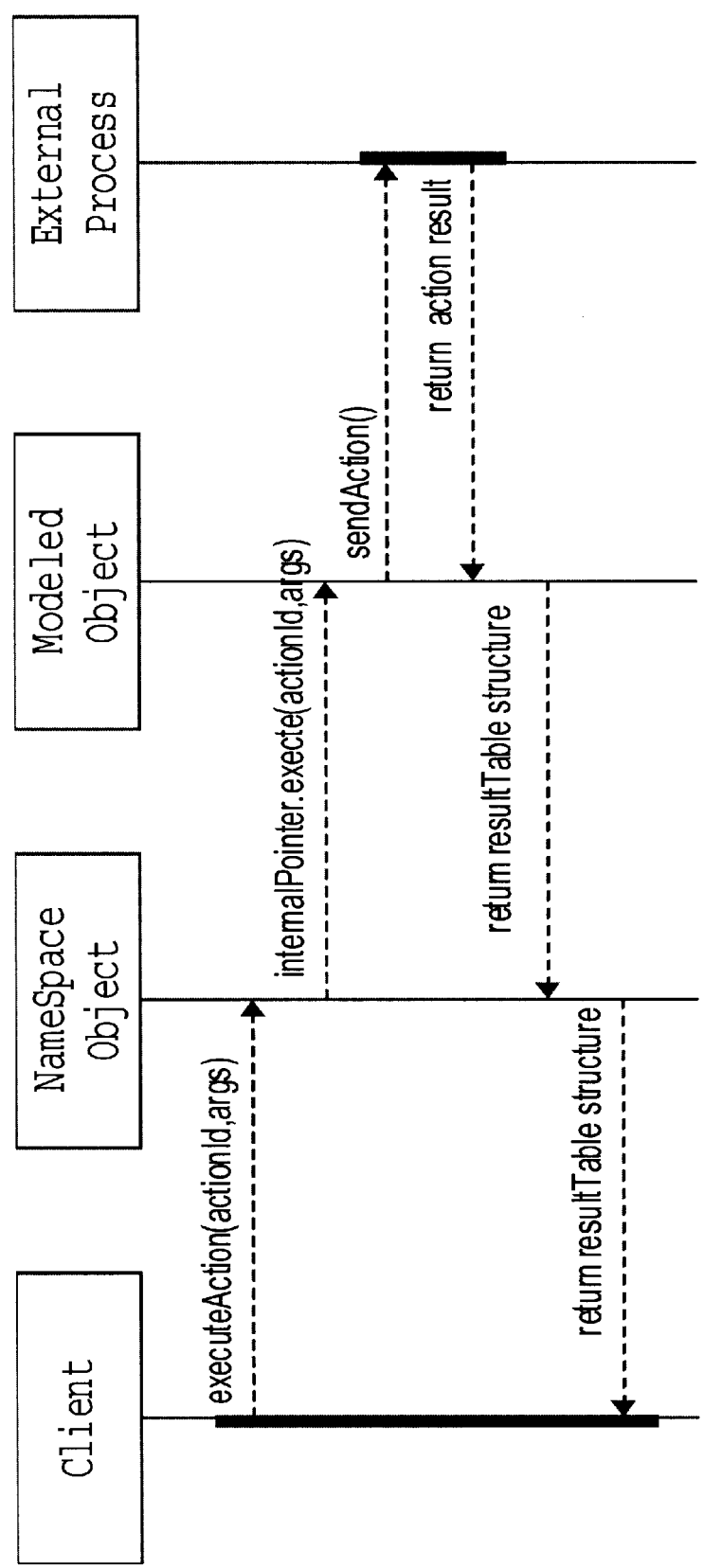

The exemplary data flow scenario of FIG. 13 (1300) assumes the client already obtained a reference to a NameSpaceObject according to the client initialization scenario and that the NameSpaceObject's internal pointer has already been set to point to the target modeled object (see model browsing scenario). This scenario shows the interactions between Client, NameSpaceObject, Server (ModeledObject) and an unspecified External Process for action execution.

Model Manipulation (1400)

Figure 14:
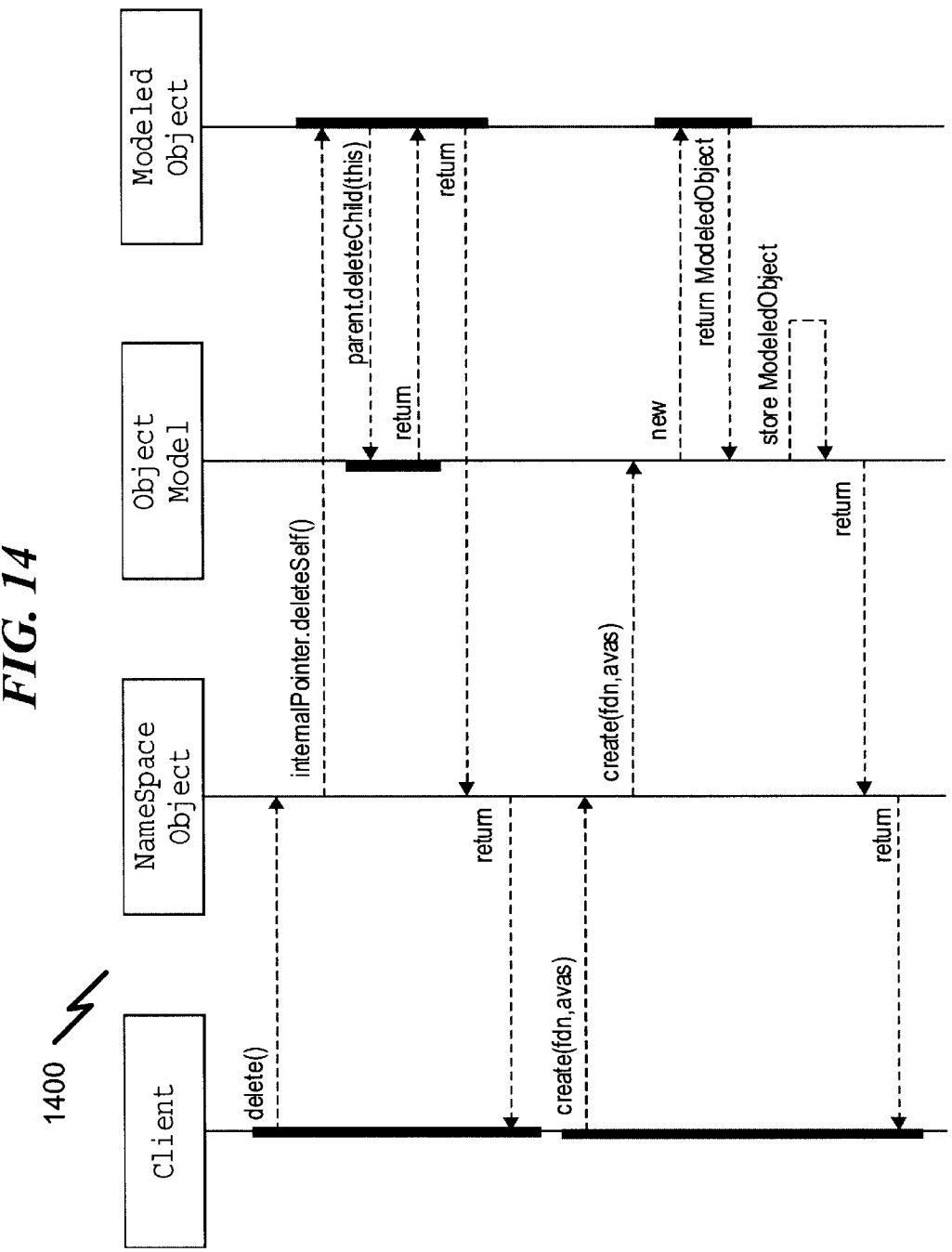

The exemplary data flow scenario of FIG. 14 (1400) assumes the client already obtained a reference to a NameSpaceObject according to the client initialization scenario and that the NameSpaceObject's internal pointer has already been set to point to the target Modeled Object (see model browsing scenario). This scenario shows the interactions between Client, NameSpaceObject and Server (Model and ModeledObject) for adding and removing an object from the model.

Exemplary Navigator Interface Modules (1500)

Figure 15:
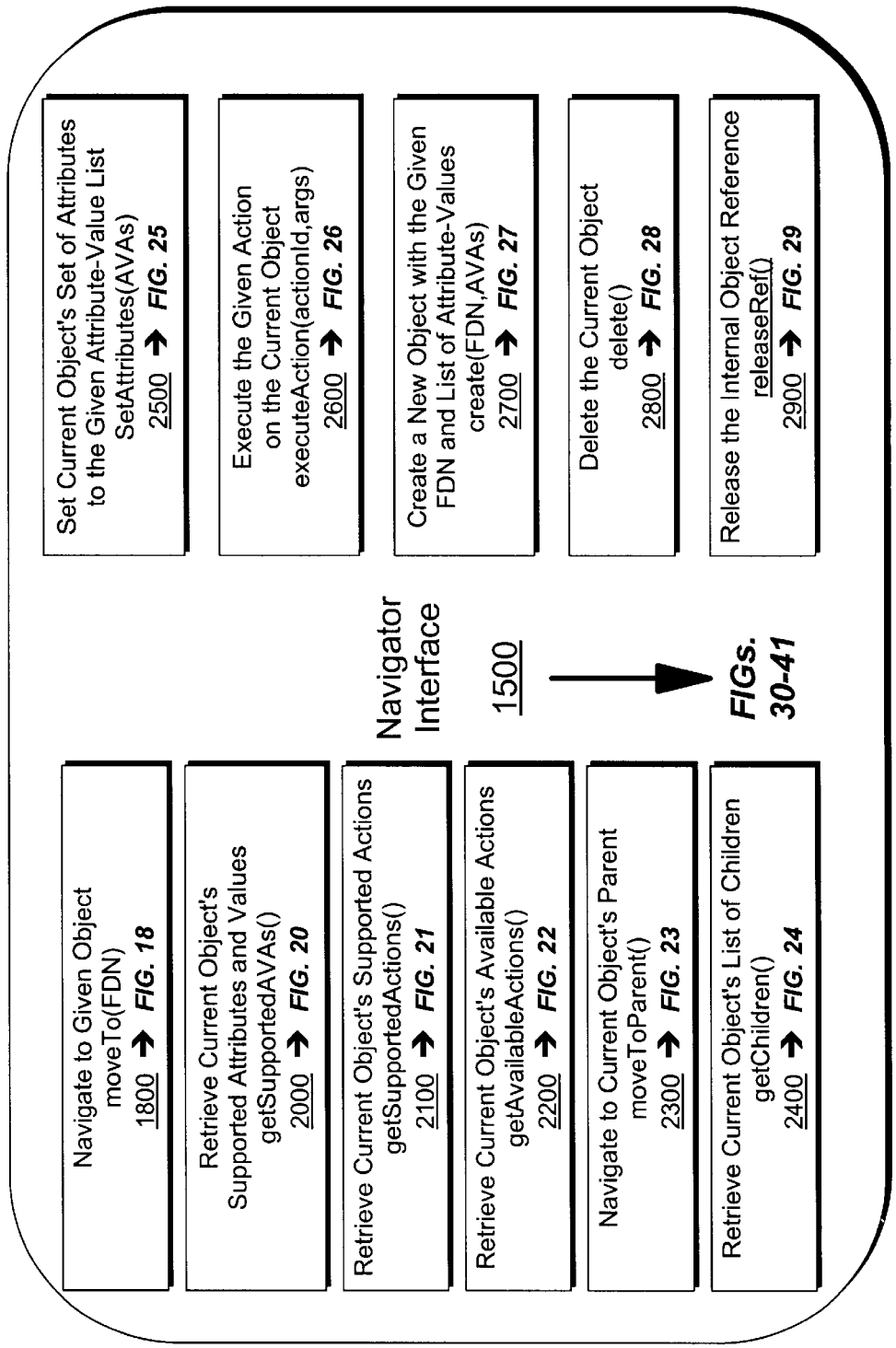
FIG. 15 illustrates an exemplary complement of modules that may be used to implement a preferred embodiment of the present invention.
Figure 16:
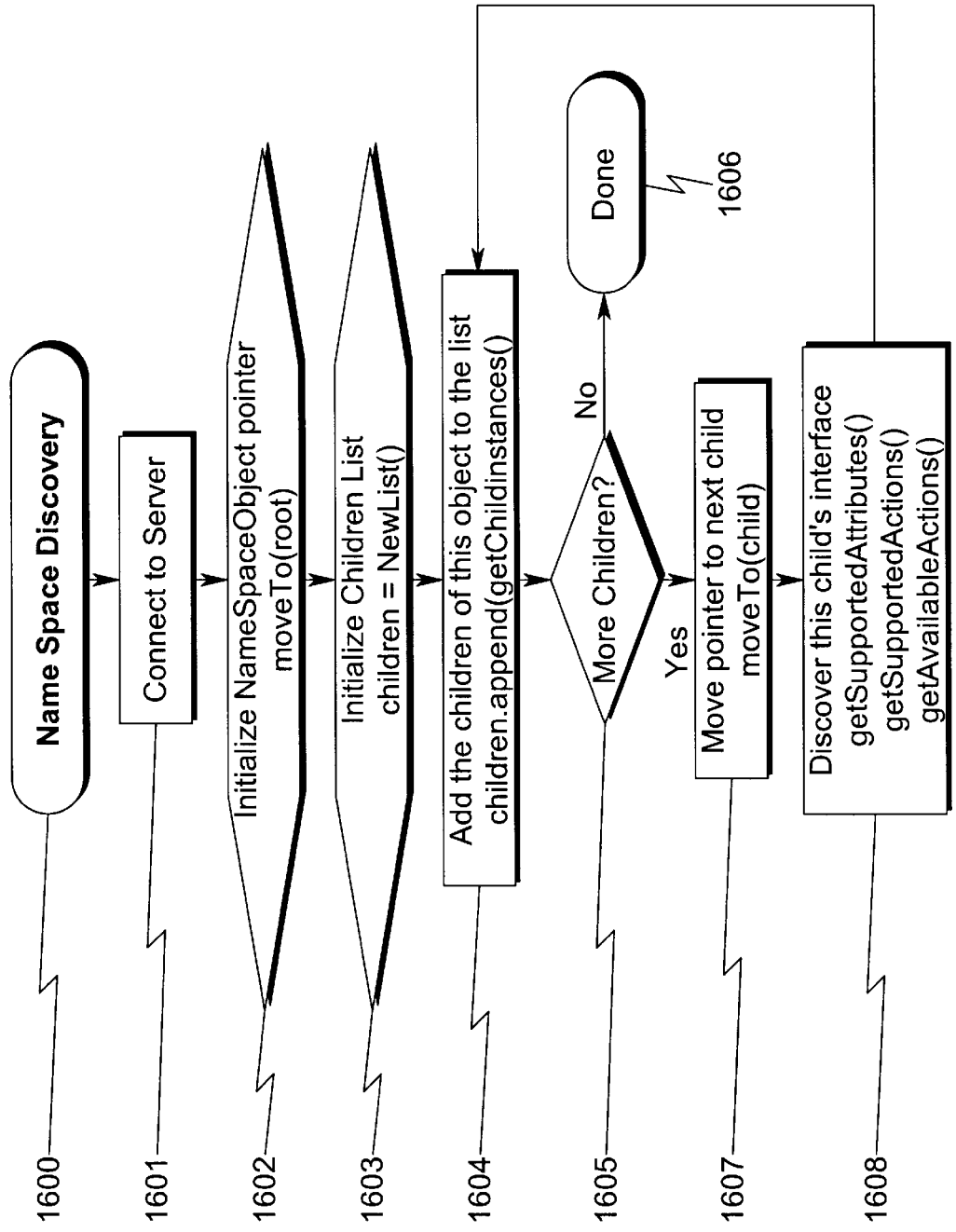
FIG. 16 illustrates an exemplary system flowchart illustrating a Name Space Discovery function that may be useful within the context of the present invention.
Figure 17:
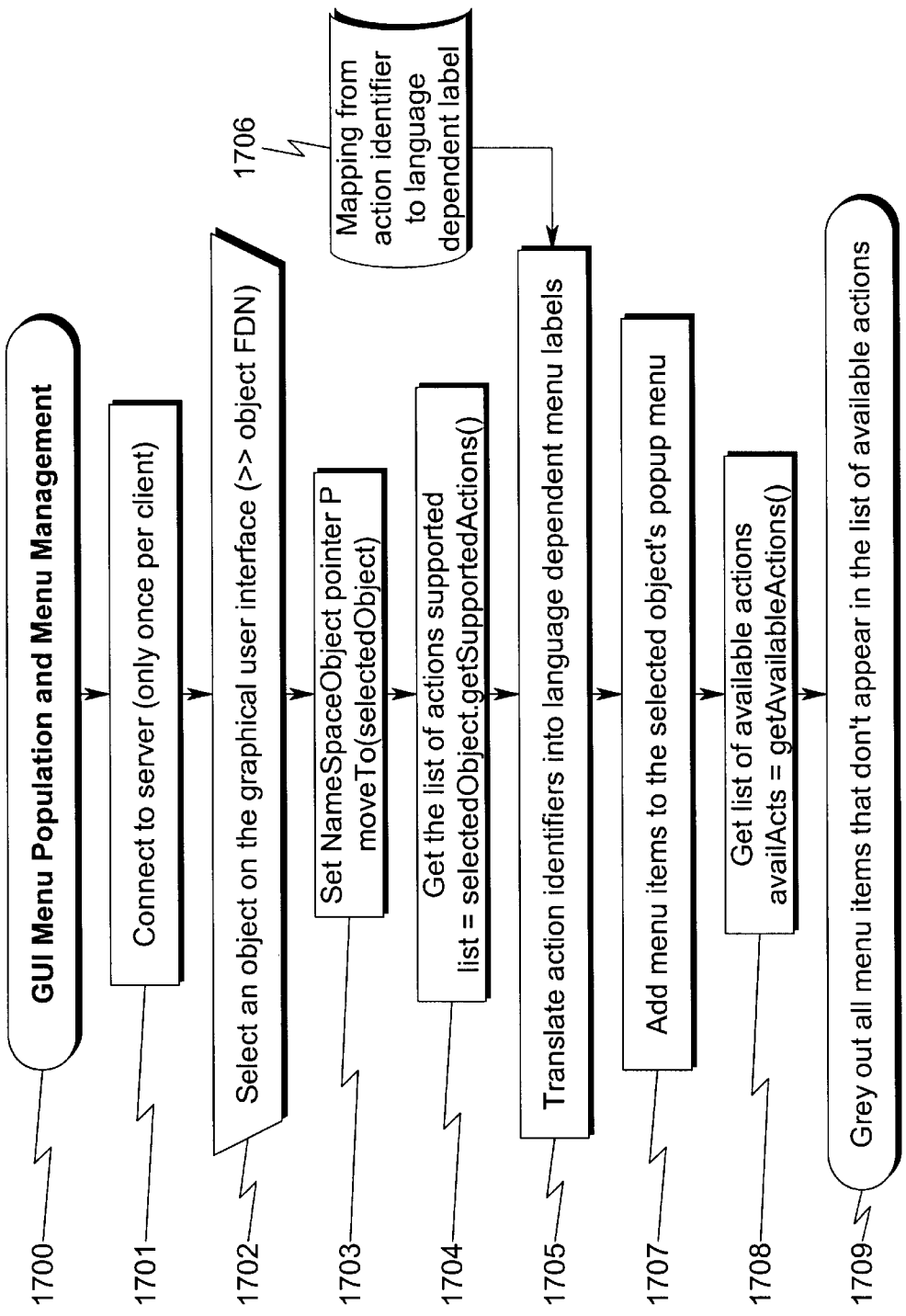
FIG. 17 illustrates an exemplary system flowchart illustrating a GUI Menu Population and Menu Management function that may be useful within the context of the present invention.

While one skilled in the art will quickly recognize that there are a plethora of methods available to implement embodiments of the present invention, it is instructive to view one exemplary embodiment of the Navigator Interface and a sample of some of the interfaces that it might permit. To this end, FIG. 15 illustrates an exemplary complement of Navigator Interface modules (1500) that are described in detail in the following sections.

All exemplary functions described below assume that a navigator interface instance was previously created for a certain view. This implies that a connection was established between the client manipulating the navigator object instance and the server implementing the data model (MIB).

Navigate to Object (1800)

The exemplary Navigate to Object function as illustrated in FIG. 18 (1800) moves the internal object pointer to the object identified by the given Fully Distinguished Name (FDN). First, the object identified by its FDN is looked up in the MIB. The search is started at the MIB root node and works its way down the hierarchical data model by recursively finding the next child object identified by each RDN in the FDN. If any such child is not found in the MIB, the function terminates by throwing a NoSuchObjectInstance exception. When the final child is found, the internal object pointer (P) is set to point to this child.

Get List Of Supported Attribute-Value Pairs (2000)

The exemplary Get List Of Supported Attribute-Value Pairs function as illustrated in FIG. 20 (2000) retrieves the attributes and corresponding values of the MIB object currently being pointed at by the internal object pointer (P). As the MIB stores generic objects, the same object class is often reused to store multiple types of real-world objects. These objects are distinguished by the value for their "type" attribute. Two objects of the same class, but with different type, don't necessarily have the same set of attributes. The supported set of attributes per object type is stored in a configuration file. This function looks up the set of supported attributes for the type of object P and returns the list of these attributes with their associated values.

Get List Of Supported Actions (2100)

The exemplary Get List Of Supported Actions function as illustrated in FIG. 21 (2100) retrieves the list of action identifiers supported by the MIB object currently being pointed at by the internal object pointer (P). As the MIB stores generic objects, the same object class is often reused to store multiple types of real-world objects. These objects are distinguished by the value for their "type" attribute. Two objects of the same class, but with different type, don't necessarily have the same set of actions. The supported set of action identifiers per object type is stored in a configuration file. This function looks up the set of supported action identifiers for the type of object P and returns the list.

Get List Of Available Actions (2200)

The exemplary Get List Of Available Actions function as illustrated in FIG. 22 (2200) retrieves the set of action identifiers available on the MIB object currently being pointed at by the internal object pointer (P), in the current state of the object. The state of an object is being defined as the values of the object's attributes. The function first retrieves the list of supported action identifiers and then runs through this list, validating each such action identifier against a set of rules. The set of rules is read from a configuration file. Each rule is an expression in terms of attribute values, optionally combined with object type. Each action identifier that passes the rule filter is added to the list to be returned by this function.

Navigate To Parent Object (2300)

Reference the exemplary Navigate To Parent Object flowchart of FIG. 23 (2300). As the navigator interface invention supports multiple independent views on the same data model (MIB), the view identifier needs to taken into account in order to find the right parent. Each modeled object in the MIB stores a pointer to the parent for each existing view. The navigator object instance is defined for a particular view and therefore stores the view identifier as well as the pointer (P) to the MIB object whose parent needs to be retrieved. If the object P doesn't store a pointer to the parent for the given view identifier, an exception is thrown. Else, the internal object pointer (P) is set to point to the parent object.

Download Children (2400)

The exemplary Download Children function as illustrated in FIG. 24 (2400) retrieves the set of Fully Distinguished Names (FDN) of the children of the MIB object currently being pointed at by the internal object pointer (P) for the view this navigator object instance is defined for. Each modeled object stores an index on the object's list of children for each view defined in the system. If the object P doesn't store an index on the children for the given view, an exception is thrown. Else, the list of children for the given view is returned.

Set Object's Attribute Values (2500)

Figure 25:
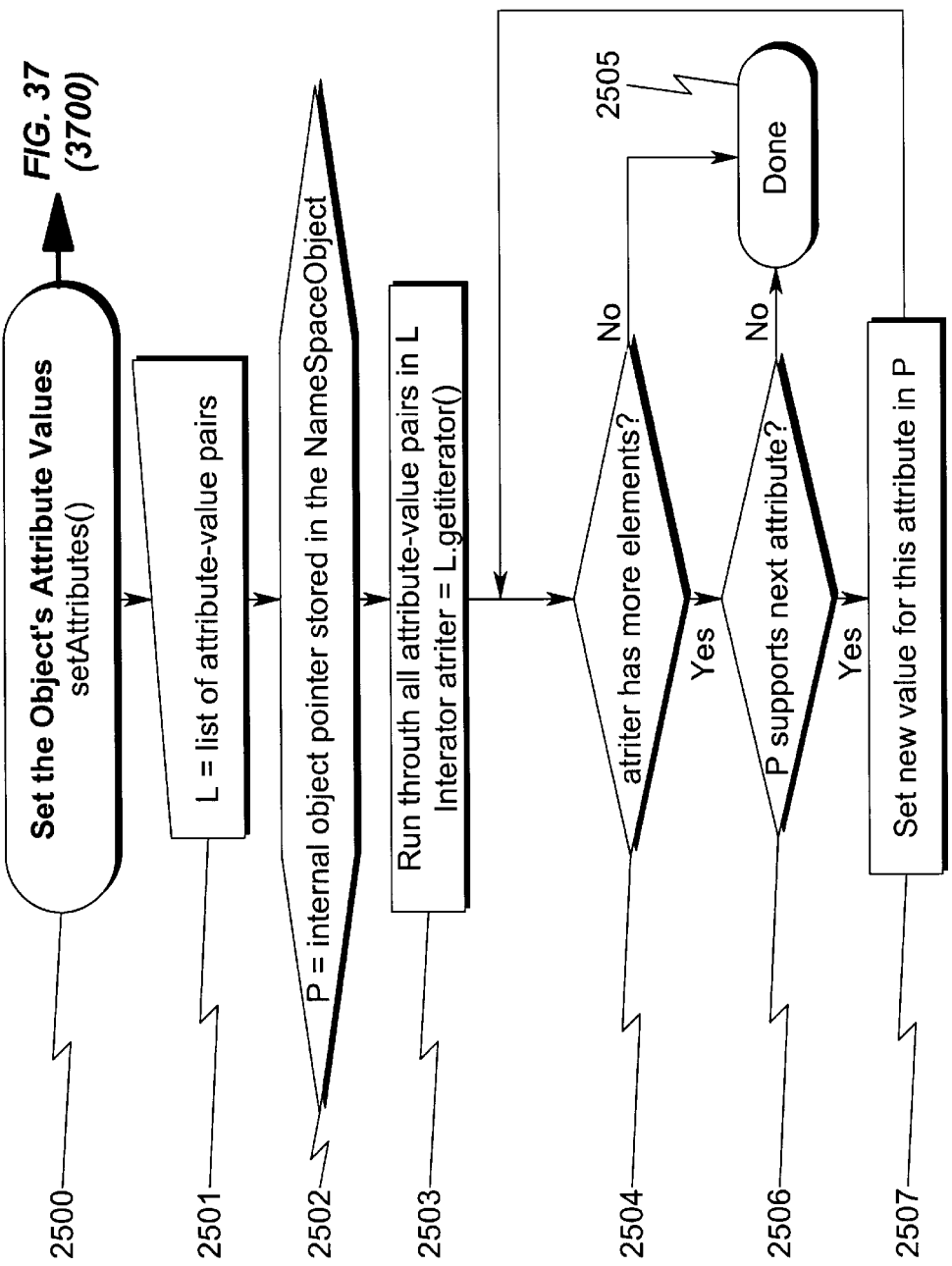
FIG. 25 illustrates an exemplary system flowchart illustrating a Set Object's Attribute Values function that may be useful within the context of the present invention.

The exemplary Set Object's Attribute Values function as illustrated in FIG. 25 (2500) updates the attribute values of the MIB object currently being pointed at by the internal object pointer (P) to the given set of attribute values. The function therefore runs through the given list of attribute-value assertions, ignoring those attributes that are not supported by the object P, and replacing the value for the attributes that are supported by the object P with the given value.

Execute Action (2600)

The exemplary Execute Action function as illustrated in FIG. 26 (2600) executes the action corresponding to an action identifier selected by the client on the MIB object currently being pointed at by the internal object pointer (P). An operator using the graphical user interface of the system first selects the object on which he/she wants to execute an action. Then, typically, a menu item of the object's pop-up menu is selected. Internally in the client, the navigator object is then used to first navigate to the selected object. This sets the navigator object's internal object pointer (P) to point to the target MIB object for the requested operation. This function then takes the action identifier corresponding to the menu selection as an input value together with the set of attribute-value pairs (provided by the client) corresponding to the arguments of the target action. The server, upon reception of the execute action request, checks the availability of the action. If the action is available in the current object's state, the action is executed. Else, an OperationNotSupported exception is thrown.

Create Child Object (2700)

Figure 27:
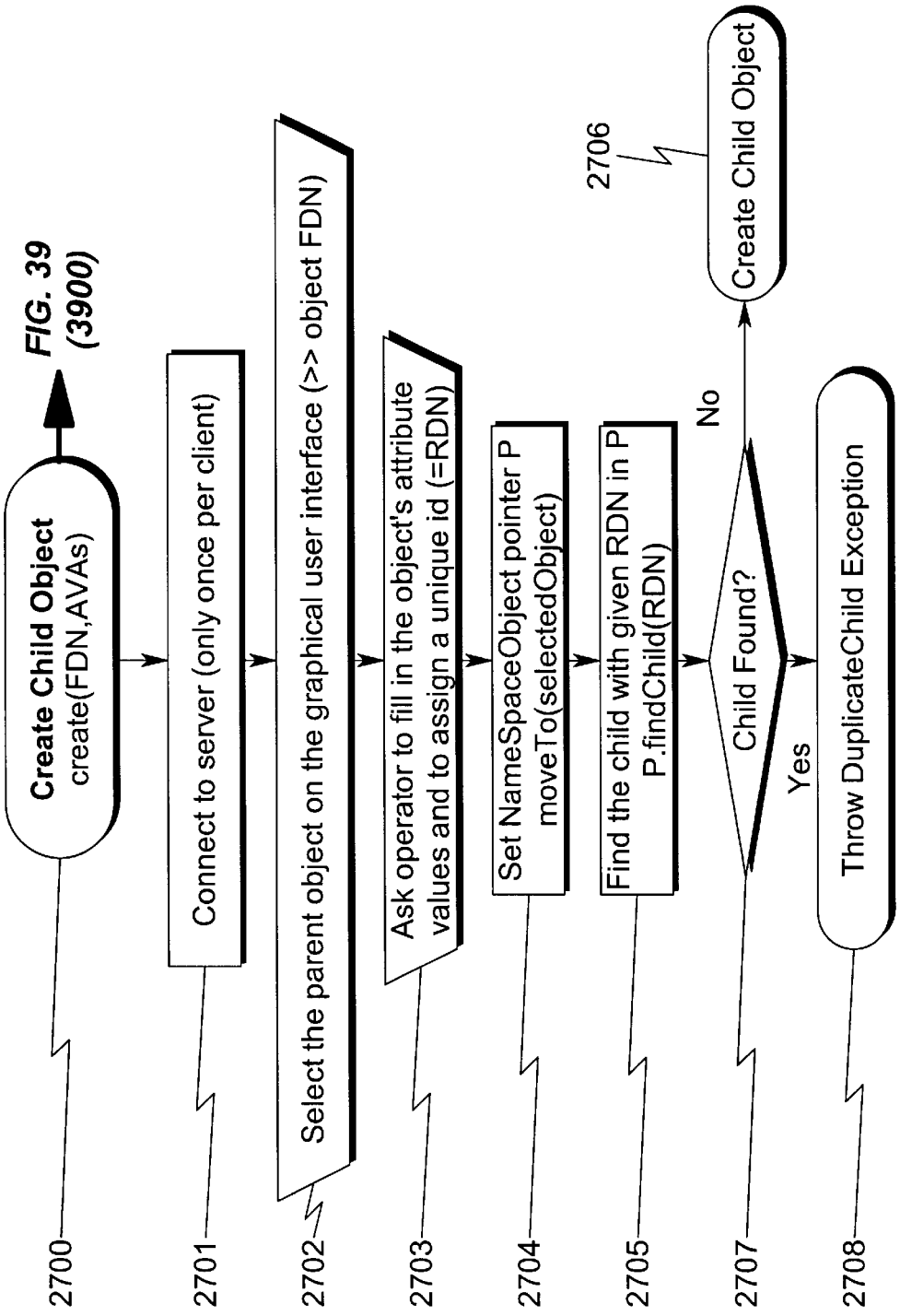
FIG. 27 illustrates an exemplary system flowchart illustrating a Create Child Object function that may be useful within the context of the present invention.

The exemplary Create Child Object function as illustrated in FIG. 27 (2700) adds a newly modeled object to the MIB. The function takes an FDN and a set of attribute-value pairs as input. The function first searches the MIB for the parent object of the object to be created. If the child is not found, an exception is thrown. Else, the function creates a new MIB object whose attribute values are initialized with the values in the given attribute-value pair list. If there is already a child object with the same RDN in the found parent, a DuplicateChild exception is thrown. Else, the function adds the object as a child of the parent object.

Delete Object (2800)

Figure 28:
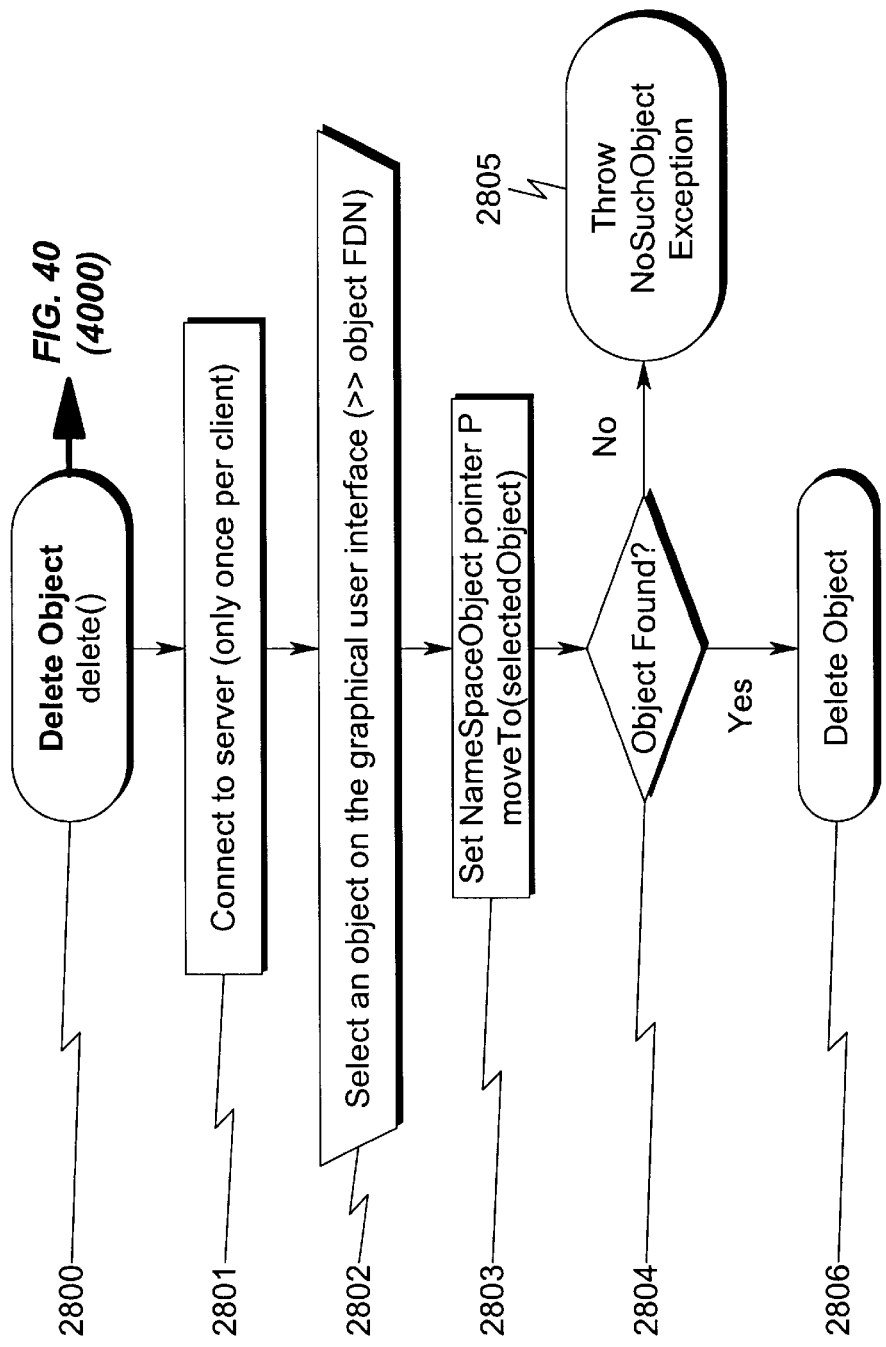
FIG. 28 illustrates an exemplary system flowchart illustrating a Delete Object function that may be useful within the context of the present invention.

The exemplary Delete Object function as illustrated in FIG. 28 (2800) deletes the MIB object currently being pointed at by the internal object pointer (P) from the MIB.

Release Internal Object Reference (2900)

Figure 29:
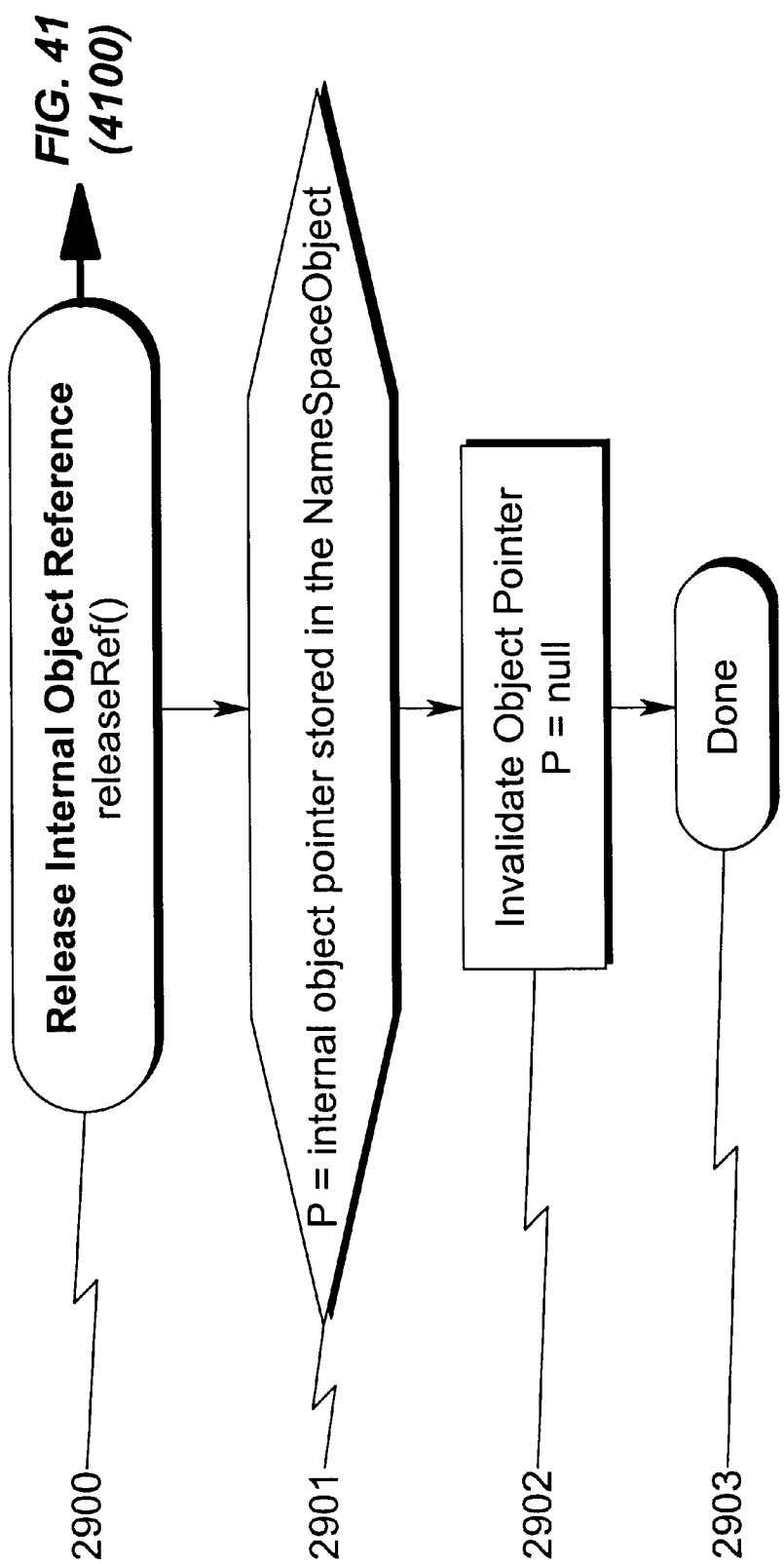
FIG. 29 illustrates an exemplary system flowchart illustrating a Release Internal Object Reference function that may be useful within the context of the present invention.

In order to be sure that the Java garbage collector can reclaim memory occupied by a deleted MIB object, the object references (pointers) towards that object should be destroyed. This function sets the navigator object's internal object pointer to null, hence destroying the reference to some MIB object. The exemplary Release Internal Object Reference function as illustrated in FIG. 29 (2900) should be called when the navigator object should be destroyed (i.e. is no longer required by the client). Otherwise, when a MIB object has been destroyed (delete object request), it could still have some navigator objects point to it, hence keeping the object's reference count above 0. Some Java garbage collectors might have trouble reclaiming the memory occupied by this object.

Exemplary Navigator Interface Description (3000–5000)

Figure 5:
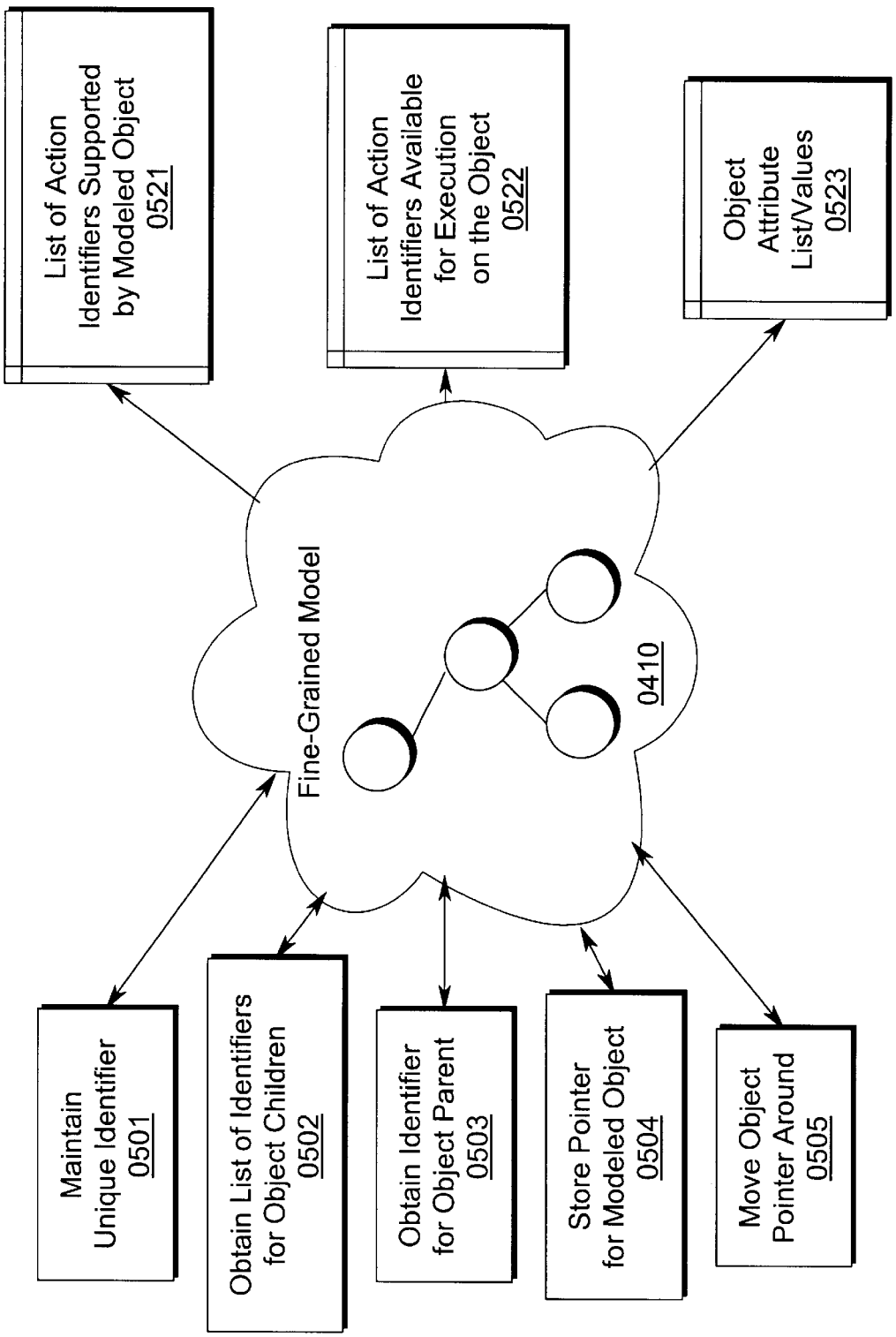
FIG. 5 illustrates an exemplary system block diagram of several manipulation functions used with the present invention.

The Navigator Interface as exemplified by the example source code embodiment of FIGS. 30–50 (3000–5000) allows a client to browse the server's (hierarchical) model without the need to know anything about the containment relationship between the objects in the model (cf. browsing a directory structure). This generally requires all of the following:

Each modeled object has a unique identifier (see FIG. 5 (0501)).

The interface provides an operation to obtain the list of identifiers of each modeled object's children (see FIG. 5 (0502)).

The interface provides an operation to obtain the identifier of an object's parent (see FIG. 5 (0503)).

The interface defines an object (CORBA, etc.) that stores a pointer to a modeled object (see FIG. 5 (0504)).

The interface provides an operation to move this object pointer around in the model (see FIG. 5 (0505)).

By browsing through the model, the interface allows each modeled object's detailed interface to be discovered. This detailed interface consists of the following:

The list of action identifiers supported by the modeled object (see FIG. 5 (0521)).

The list of action identifiers available for execution on the object in the object's current state (see FIG. 5 (0522)).

The object's attribute list (including the attribute values) (see FIG. 5 (0523)).

Figure 4:
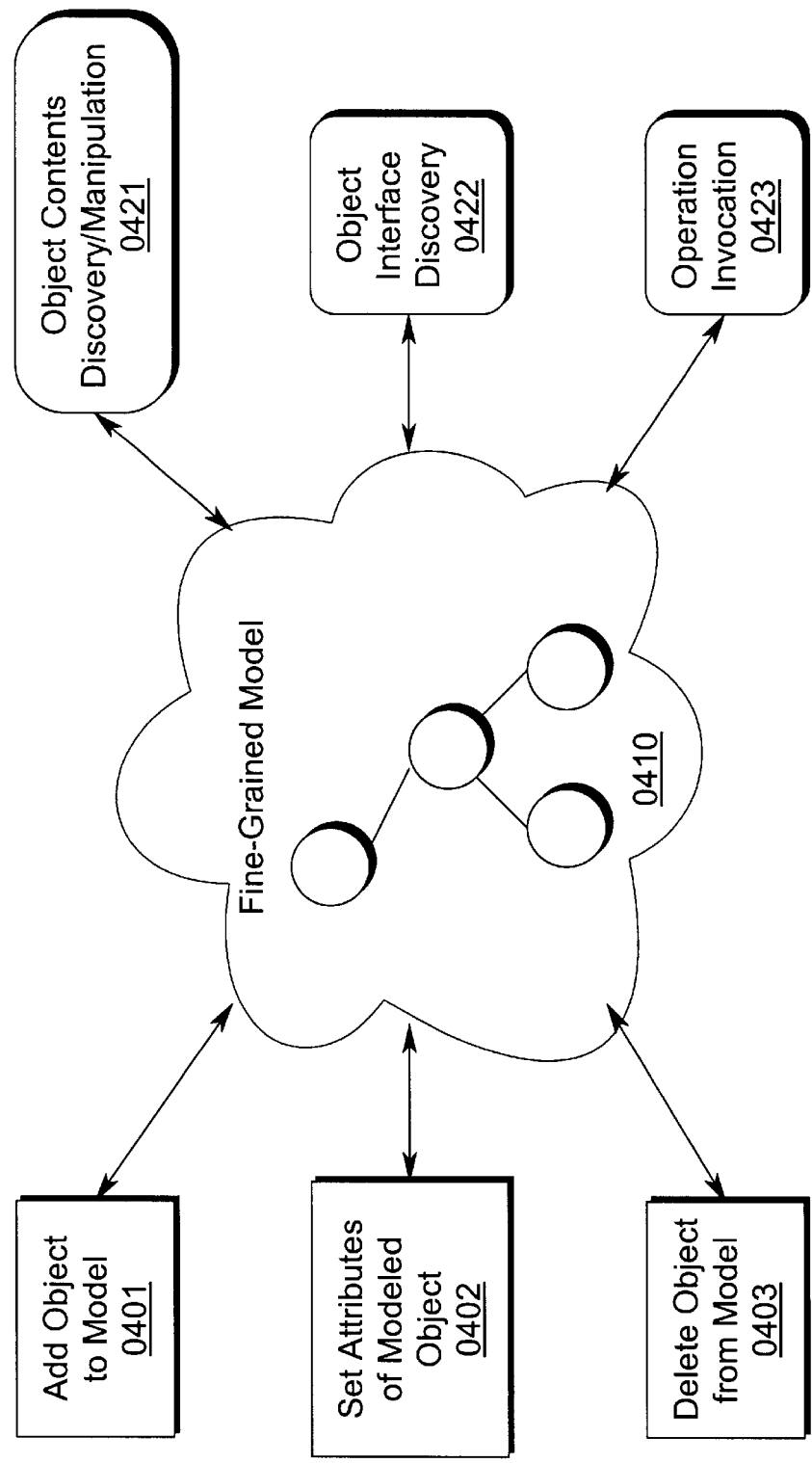
FIG. 4 illustrates an exemplary system block diagram of the present invention.

The interface provides operations to manipulate the model and the modeled objects. The available operations are:

An operation to add an object to the model (see FIG. 4 (0401)).

An operation to set a modeled object's attributes (see FIG. 4 (0402)).

An operation to delete an object from the model (see FIG. 4 (0403)).

One skilled in the art will no doubt realize that other operations are also possible, as well as additions/deletions from the above list.

Exemplary Navigator Method (0600)

Figure 6:
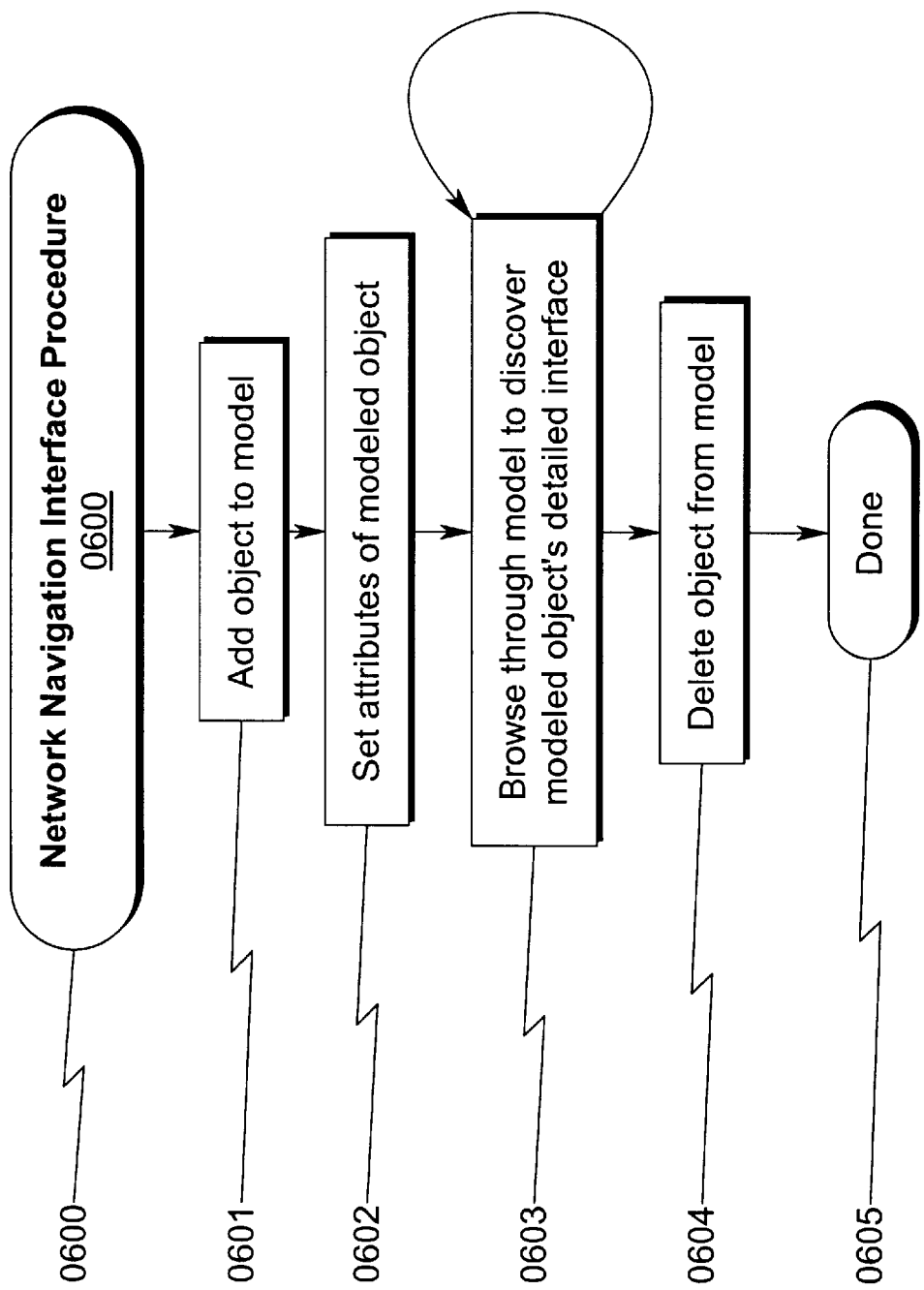
FIG. 6 illustrates a process flowchart that exemplifies the operation of a preferred embodiment of the present invention.

The present invention may be implemented using a variety of methods and/or processes. A generalized view of one preferred embodiment is illustrated in FIG. 6 (0600). Here we see that the Network Navigation Procedure (0600) generally includes the following steps:

1. Adding objects to a model (0601).
2. Setting the attributes of a modeled object (0602).
3. Browsing through the model to discover the modeled object's detailed interface and optionally manipulating the modeled object based on this information (0603).
4. Deleting the object from the model (0604).

One skilled in the art will realize that these steps can be performed in any order, and that in some circumstances additional steps may be needed and in other circumstances there will be steps that are deleted from the process.

PREFERRED SYSTEM CONTEXT OF THE PRESENT INVENTION

While the present invention may be best applied to situations in which telecommunications networks are to be managed and maintained either locally or remotely using graphical user interface (GUI) based operator consoles, the present invention also has wide applicability in situations in which any type of object oriented component in a computer network is to be managed in a uniform way with minimal software design complexity and maintenance costs.

The functional elements of the present invention are widely applicable to situations involving multiple types of remote equipment sourced from a variety of hardware and software manufacturers. Since the present invention breaks the compile-time link between network element management and the tool used to perform the management function, this permits a wide variety of applications in situations where networks must be grown dynamically by adding hardware and software, but which must remain up and functional during this upgrade process.

CONCLUSION

A network navigator interface system and method incorporating a client/server architecture in which a network coarse-grained model (or single object) (NameSpaceobject) is used to browse/manipulate a fine-grained object model has been disclosed. The disclosed invention permits a client application to discover the detailed interface provided by each object instance in the fine-grained model. A client application wishing to invoke an operation on a server-side object first obtains an object reference (IOR) to a NameSpaceObject instance. Each NameSpaceObject instance stores a pointer to an object in the fine-grained model. The NameSpaceObject interface provides operations to move this pointer around in a hierarchical model. Once the pointer is set to reference a certain object in the fine-grained model, this object becomes the target for all further operations. The available operations include object contents discovery/manipulation, object interface discovery and operation invocation.

CLAIMS

Although a preferred embodiment of the present invention has been illustrated in the accompanying Drawings and described in the foregoing Detailed Description, it will be understood that the invention is not limited to the embodiments disclosed, but is capable of numerous rearrangements, modifications, and substitutions without departing from the spirit of the invention as set forth and defined by the following claims.

What is claimed is:

1. A network navigator interface system comprising:
   (a) means for setting attributes of a modeled object, the modeled object having parents and children, each of said parents and children of said modeled object having a list of unique indentifiers;
   (b) means for adding an object to a model;
   (c) means for deleting an object from said model;
   wherein
   means for providing an operation to obtain the list of unique identifiers of said modeled object's children,
   said means for providing further for providing an operation to obtain the list of unique identifiers of said object's parent;
   means for defining an object that stores a pointer to said modeled object;
   means for moving said stored pointer around in said model; and
   a personal computer (PC) for implementing at least a portion of the network nagivator interface system, said PC utilizing a graphical user interface, with the graphical user interface utilizing at least one of a HP-UX™ operating environment, a LINUX™ operating environment, a SOLARIS™ operating environment, a UNIX™ operating environment, and a Microsoft® Windows™ operating environment.

2. The network navigator interface system of claim 1 wherein said setting/adding/deleting means and said modeled object reside on separate nodes within a computer network.

3. The network navigator interface system of claim 1 wherein said setting/adding/deleting means occurs via communication over the Internet.

4. The network navigator interface system of claim 1 wherein one or more components of said system is implemented within a CORBA object oriented framework.

5. The network navigator interface system of claim 1 wherein said setting/adding/deleting means further comprises:
   (a) a navigate to given object means;
   (b) a retrieve current object's supported attributes and values means;
   (c) a retrieve current object's supported actions means;
   (d) a retrieve current object's available actions means;
   (e) a navigate to current object's parent means;
   (f) a retrieve current object's list of children means;
   (g) a set current object's set of attributes means;
   (h) an execute given action on current object means;
   (i) a create new object means;
   (j) a delete current object means; and
   (k) a release internal object reference means.

6. The network navigator interface system of claim 5 wherein said setting/adding/deleting means and said modeled object reside on separate nodes within a computer network.

7. The network navigator interface system of claim 5 wherein said setting/adding/deleting means occurs via communication over the Internet.

8. The network navigator interface system of claim 5 wherein one or more components of said system is implemented within a CORBA object oriented framework.

* * * * *